United States Patent [19]

Impink, Jr. et al.

[11] Patent Number: 4,552,718
[45] Date of Patent: Nov. 12, 1985

[54] METHOD AND APPARATUS FOR ON-LINE MONITORING OF THE OPERATION OF A COMPLEX NON-LINEAR PROCESS CONTROL SYSTEM

[75] Inventors: Albert J. Impink, Jr., Delmont; Joseph A. Rumancik, Murrysville; James R. Easter, Plum Borough, all of Pa.

[73] Assignee: Westinghouse Electric Corp., Pittsburgh, Pa.

[21] Appl. No.: 394,078

[22] Filed: Jul. 1, 1982

[51] Int. Cl.$^4$ ................................................ G21C 7/36
[52] U.S. Cl. ..................................... 376/216; 376/245
[58] Field of Search ............... 376/215, 216, 217, 245; 364/140, 148, 550

[56] References Cited

U.S. PATENT DOCUMENTS

| | | | |
|---|---|---|---|
| 3,984,699 | 10/1976 | Bailey | 364/140 |
| 4,064,392 | 12/1977 | Desalu | 376/217 |
| 4,079,236 | 3/1978 | Graham et al. | 376/245 |
| 4,217,658 | 8/1980 | Henry et al. | 364/900 |
| 4,254,412 | 3/1981 | Togneri | 340/525 |
| 4,298,955 | 11/1981 | Munday et al. | 364/900 |
| 4,318,778 | 3/1982 | Musick | 376/216 |
| 4,443,858 | 4/1984 | Piaton | 364/518 |
| 4,459,259 | 7/1984 | Colley | 376/217 |

FOREIGN PATENT DOCUMENTS

| | | | |
|---|---|---|---|
| 100640 | 2/1984 | European Pat. Off. | 376/245 |
| 1476937 | 6/1977 | United Kingdom | 376/216 |

Primary Examiner—Charles T. Jordan
Assistant Examiner—Richard Klein
Attorney, Agent, or Firm—Daniel C. Abeles

[57] ABSTRACT

The operation of a nuclear fueled, electric power generating unit is monitored by utilizing decision tree analysis of selected system parameters to generate a representation of the real time system status. Current system status is presented to the operator either in the form of conclusory indications, such as verbal statements, representative of system status, or in the form of a visual display of the entire decision tree including indications of the path through the tree representative of current conditions. In either case, indications of off-normal conditions are accompanied by directions as to appropriate action to be taken, either by the operator or the automatic control system, to steer the system toward more acceptable conditions. In addition, the status indications are prioritized to indicate the seriousness of the off-normal conditions and to direct the sequence of corrective action to be taken when multiple off-normal conditions exist. The decision tree displays are generated either on a color cathode ray tube by a programmed digital computer, or manually on a hard wired panel by an operator who operates switches to illuminate the appropriate branches of the tree based upon meter readings of the selected parameters incorporated into the panel at each branch point. In one embodiment, the invention is applied to monitoring system status when the unit is at power, and in another, it is applied to providing clear, unambiguous indications of the real time status of selected critical safety functions and of appropriate corrective action to be taken, if necessary, following a reactor trip.

45 Claims, 40 Drawing Figures

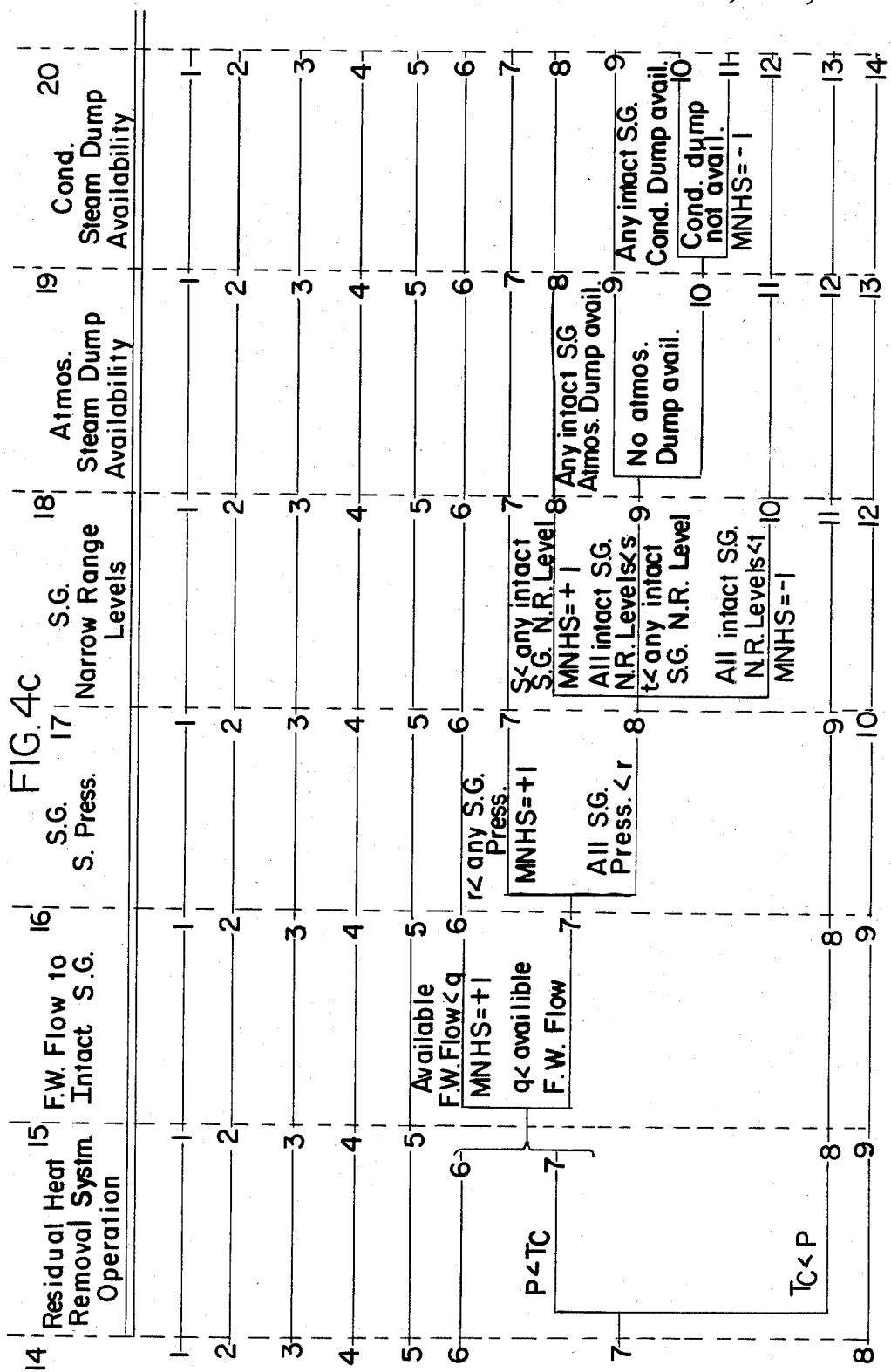

"high power" display

NSSS Status

The Unit Is Operating At 100% Of Rated Power

| Trip | Margin Status |
|---|---|
| High Nuclear Flux | 3 |
| Overpower $\Delta T$ | 3 |
| Overtemp. $\Delta T$ | 3 |
| High Pressurizer Press. | 2 |
| Low Pressurizer Press. | 3 |
| High Pressurizer Level | 1 |
| Lo-Lo S.G. Level | 3 |

FIG. 6

The Unit Is Not Shutdown

The Unit Has Returned To Power
With all rods Inserted

FIG. 7

Off Normal Conditions

Definitely Identified Conditions

Low-Low Coolant Inventory

Net Loss Of Coolant From RCS

Continuing Leakage Of Coolant From RCS

Reactor Coolant At Saturation Temp.

Possible Conditions

Void In S.G. Tubes

FIG. 8

Reactor Coolant System Integrity

Containment

Containment Press.
>(r) PSIG — Go to FR-Z.1

CONTPRE

Containment Press.
>(s) PSIG — Go to FR-Z.1

Containment Press.
<(r) PSIG

CONTPRE

Containment Sump Level
>(t) — Go to FR-Z.2

Containment Press.
<(s) PSIG

CONTSUL

Containment Sump Level
<(t)

Containment Radiation >(u) — Go to FR-Z.3

CONTRAD

Containment Radiation <(u) — CSF Sat.

FIG. 19

Critical Safety Function Status Summary

Existing Hazardous (Red) Conditions
Condition                    Applicable
                             Procedure (None)                       (None)

Potentially Dangerous (Orange) Conditions
Condition                    Applicable
                             Procedure Marginal Core Cooling        FR-C.2

Abnormal Containment Envionment  FR-Z.2

Function Restoration Procedures
To Be Activated Immediately

First Priority       FR-C.2
        (title of procedure)

Off-Normal Yellow Conditions
Condition                    Applicable
                             Procedure Abnormal Stress In RCS Boundary    FR-P.3

RCS Liquid Inventory Low           FR-I.2

FIG. 21

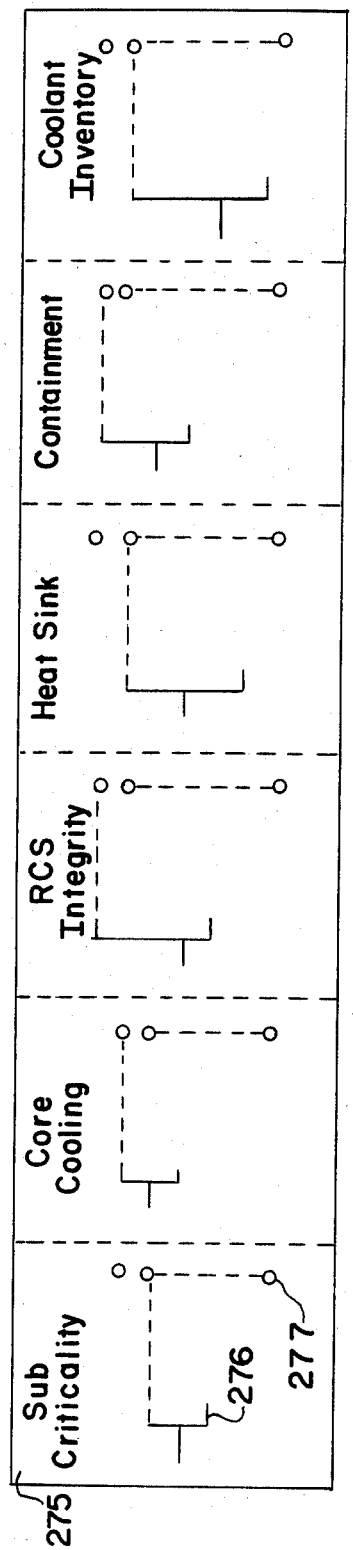
FIG. 31
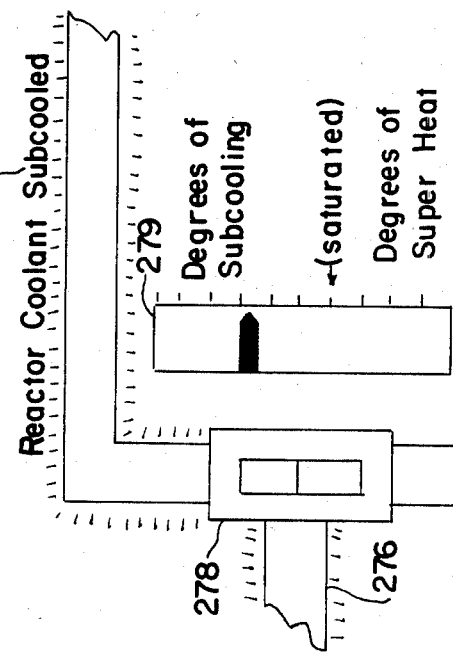
FIG. 32
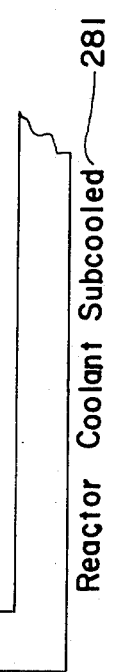

METHOD AND APPARATUS FOR ON-LINE MONITORING OF THE OPERATION OF A COMPLEX NON-LINEAR PROCESS CONTROL SYSTEM

BACKGROUND OF THE INVENTION

1. Field of the Invention

This invention relates to a method and apparatus for monitoring the operation of complex, non-linear process control systems such as those used with nuclear fueled electric power generating units and more particularly it relates to a method and apparatus for evaluating the status of such a complex system through a systematic analysis of the vast amount of data gathered from locations throughout the system. While the invention has particular application to the identification of critical conditions in the system, it is also useful in detecting any deviations from normal operating conditions.

2. Prior Art

Modern process control systems have reached a stage of sophistication where they can do a very fine job of automatically or semi-automatically controlling a complex non-linear process within preset parameters despite perturbations to the system. Many of these control systems are also capable of shutting down a process when major disturbances are encountered. However, it is still desirable, and even mandatory in many applications, that a human operator maintain ultimate control over the process. For instance, while an automatic process control system may be able to cope with previously identified perturbations in the system, there is always the possibility that some unpredicted disturbance will occur such as unexpected combinations of unrelated component failures. Even where the automatic system could respond by shutting down the system, it may be possible that certain steps could be taken to work around the problem or that where the condition is identified early enough action could be taken to return the system to stability without reaching a crisis.

The ability of an operator to intervene in the operation of a complex, non-linear process control system is complicated by the vast amount of information that must be analyzed. An approach to the problem is addressed in U.S. Pat. No. 4,298,955. There, a decision table is used to compare various combinations of measured values of system parameters with set point values. Each of the selected combinations is assigned an importance value representing the seriousness of the situation represented. The output can be used to notify the operator of the problem and, if desired, to effect control changes. However, in a system with even a moderate number of parameters, the number of possible combinations of measured values compared to the corresponding set point is unmanageably large. This requires that only those combinations representing probable events can be selected for detection. Unfortunately, such a selective process can result in eliminating, and therefore precluding the detection of, particular occurrences which although unlikely, could occur as a result of multiple system failures.

The present invention applies decision tree analysis to solving the problem. The decision tree is an analytical tool that has found application in the analysis of situations wherein various combinations of events can occur. The events are analyzed sequentially with the sequence being determined by the occurrence or non-occurrence of the previous event in the sequence. They have been used in fault analysis where the failure or continued operation of each component in the system constitute the events with the various combinations of component failures leading ultimately to system failure. By assigning a probability to the failure of each component, the reliability of the overall system can be projected. Decision trees have also been applied to risk analysis. Starting with a particular condition, the sequence of possible events is charted out to include all possible combinations of the occurrence or non-occurrence of each event leading to various possible ultimate events. Again by assigning a probability to the occurrence of each event, the likelihood of the occurrence of each ultimate event can be predicted. Decision tree analysis can be carried out graphically by drawing a pattern of lines which converge with the occurrence of each combination of failures down to a single line in the case of fault analysis and which diverge from a single line to a multitude of branches in the case of risk analysis. Heretofore, however, the possibility of the application of the principals of decision tree analysis has not been applied to on-line monitoring of process control system operation.

An example of a complex, non-linear process control system in which a vast array of data must be analyzed in order to determine the condition of the system is a nuclear fueled electric power generating unit. While such systems are provided with reliable automatic controls with built-in redundancy and a reactor trip system which will shutdown the plant completely should operation deviate too far from normal, the operator must be, and is, able to override the automatic controls. In order to do so effectively, however, he must be able to determine from all the information available what action is required and what action is appropriate. Multiple failures could cause complex, unanticipated interactions between the various sub-systems which if not properly analyzed could lead to inappropriate action which could aggravate rather than ameliorate conditions. Whatever happens in the system; however, the primary goal is always to prevent the release of radiation from the plant. In view of this, the Nuclear Regulatory Agency has issued regulations requiring that the operator be presented with evidence of the status of certain identified critical functions related to the containment of radiation.

SUMMARY OF THE INVENTION

According to the present invention, the operation of a complex, non-linear process control system is monitored by periodically, sequentially comparing the current values of selected system parameters with stored setpoint values to determine the current ranges of the selected parameters. The parameters are selected for sequential comparison on the basis of the current range of the preceeding parameter selected and the sequence thus generated is an indication of the status of the system. Such an analysis can be depicted by a pattern of lines which begins with a single line and branches out at each point where a comparison is made with each of the lines emanating from the branch point representing selected ranges of the current value of the parameter relative to the associated setpoint. The sequence of comparisons then defines a path through this pattern of lines. Indications of the status of the system can be generated in two ways: the last or terminal branch in the selected path can be used to indicate the status, or indications of selected conditions can be generated as they become identified in the sequence of comparisons.

Although it is not an essential part of all embodiments of the invention, a visible display of the pattern of lines can be generated either in a hard wired configuration, such as with the line segments implemented by energizable light emitting elements, or through use of a cathode ray tube display. The selected path through the pattern of lines can be indicated in various ways such as by flashing the selected branches and the use of colors. In the preferred embodiment, the current values of the parameters and the set point values are displayed adjacent the branch points.

The present invention has particular application in providing the operator of a nuclear fueled electric power generating unit with real time information on plant status especially under circumstances where the reactor has been tripped. For this application, several status trees each associated with a critical safety function are generated. These trees can be presented sequentially on a cathode ray tube display or, in its simplest and most reliable form, on the hard wired panels discussed above. In the latter embodiment, meters marked with the appropriate setpoint values are provided adjacent each branch point to display the current value of the associated parameter and permit the operator to determine the current range of each parameter. Based on this observation, the operator sets a manual switch at the branch point to indicate the selected branch. The operator proceeds successively through the branch points to light the path through the pattern of lines representative of the current status of each of the critical safety functions. In both the hard wired and cathode ray tube embodiments of the invention, there is an indicator adjacent each terminal branch which conveys instantly to the operator the seriousness of the current status. This indicator may take the form of a color coded light. The terminal branch itself may also be color coded to reinforce the status indication.

It is also a part of this invention to provide adjacent each terminal branch, indications of procedures to be followed to improve plant status. In the cathode ray tube embodiment of the invention, it is also useful to provide a summary display which lists the procedures called for, highlights newly called for procedures and assigns priority to their execution.

The present invention is also applicable to monitoring plant status when the unit is at power. During this phase, the margins to the various reactor trips and their rates of change are monitored and indications are generated of the likelihood of each trip occurring.

The present invention in all its embodiments provides a systematic analysis of the vast amount of data available in a complex, non-linear process control system and presents to the operator a clear indication of current system status and indicates procedures to be followed, including the priority of their execution, in order to steer the system toward normal, or at least safer, conditions.

BRIEF DESCRIPTION OF THE DRAWINGS

FIGS. 6, 7 and 8 are illustrations of typical displays generated by the system of FIG. 5;

FIGS. 15 through 20 are illustrations of Critical Safety Function Status trees according to another aspect of the invention;

FIG. 21 is an illustration of a typical summary display which can be generated in connection with the status trees illustrated in FIGS. 15 through 20;

FIG. 31 is a front elevation view of a display panel in accordance with yet another aspect of the invention; and FIG. 32 is an enlarged view showing details of a portion of the panel illustrated in FIG. 31.

DESCRIPTION OF THE PREFERRED EMBODIMENTS

Figure 1:
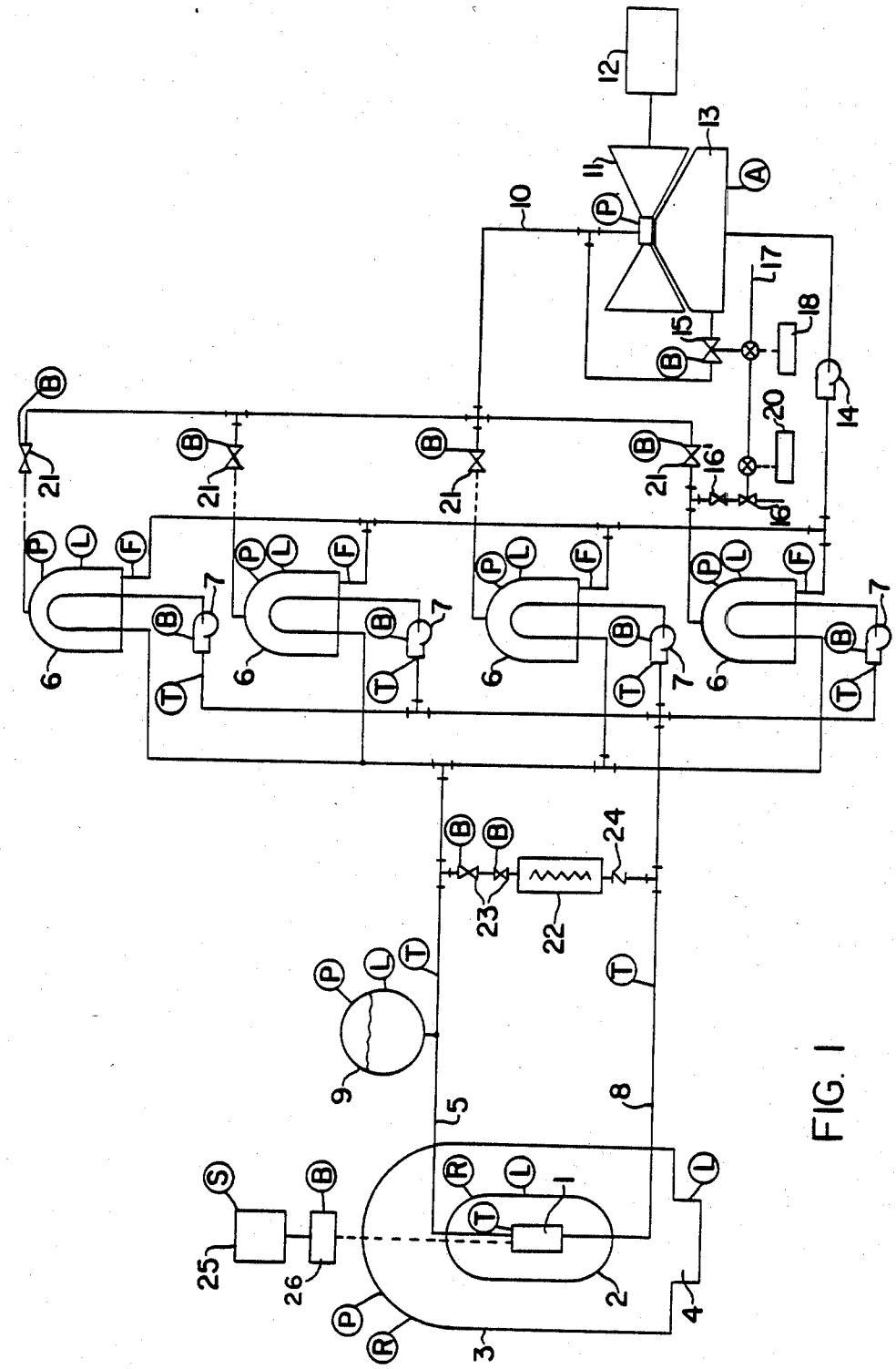
FIG. 1 is a schematic diagram of a pressurized water reactor nuclear fueled electric power generating system embodying the invention.

While the present invention is adaptable for use with various types of complex non-linear process control systems, such as chemical plants, steel plants etc., it will be described as applied to a nuclar fueled electric power generating unit and in particular to a four loop pressured water reactor (PWR) unit. As shown schematically in FIG. 1, the system comprises a nuclear reactor which includes a core 1 of fissionable material immersed is a liquid coolant (in this case water) inside a reactor vessel 2. The reactor vessel in turn is housed in a containment structure 3 which is provided with a sump 4. A controlled nuclear chain reaction in the fissionable material of the core heats the liquid coolant which is circulated from the reactor vessel through hot side piping 5 to the tube side of one or more (in this case 4) steam generators 6 by pumps 7 which return the coolant to the reactor core 1 through cold side piping 8. A pressurizer 9 maintains this circuit, which is known as the primary loop, filled with coolant at a preset pressure.

The heat carried by the reactor core coolant through the tubes of the steam generators 6 converts water introduced into the shell sides of the steam generators into steam. The steam from the individual steam generators is collected in a header 10 for introduction into a turbine 11 which drives a generator 12. Vitiated steam from the turbine 11 is drawn into a condenser 13 where it is condensed for recirculation to the steam generator by a pump 14. Should the generator 12 trip, the steam from header 10 is dumped directly into condenser 13 by steam dump valve 15 in order to preclude overspeed of the turbine 11. In the event that the condenser does not have sufficient capacity available to accept all of the steam to be dumped, an atmospheric dump valve 16 associated with each steam generator (only one shown) can be opened to vent the excess steam until the reactor can accommodate to the reduction in load. Both the valves 15 and 16 are air operated by compressed air supplied through an air header 17. The steam dump valve 15 is operated by a selector 18 on the basis of either average steam temperature or steam pressure. The atmospheric dump valves 16 can be operated either automatically or manually as determined by selectors 20. Should it become necessary to take an individual steam generator out of service, such as where a leak develops between the primary and secondary side, a main steam isolation valve 21 and a manual atmospheric dump isolation valve 16[1] associated with that steam generator can be closed. When the reactor is operating at very low temperature levels, the steam generators are inefficient for heat removal. Consequently, a residual heat removal system in the form of heat exchangers 22 (only one shown) are connected between the hot and cold legs of the primary loop each by their own series connected valves 23 and check valve 24 so that the heat generated in the reactor core can be extracted from the coolant.

Under normal operating conditions the power level of the reactor core 1 is controlled by a boron control system and a control rod system (not shown). The control rod system, since it can lower the reactivity of the core rapidly through the insertion of neutron absorbing material into the core, is also used to shut down the reactor when called for by one of the protection systems. The protection systems (not shown) which are well known by those skilled in the art, monitor specified parameters throughout the plant and generate a reactor trip signal by setting a bistable 25 when specified criteria indicate that an unsafe or undesirable condition is being approached. The reactor trip signal in turn controls the circuit breaker for control rod insertion system 26. Typical reactor trips are discussed below in connection with the description of the status trees used in the present invention.

In monitoring and controlling the PWR unit, a great many parameters throughout the plant are monitored on a real time basis. These parameters include such things as temperatures, pressures, liquid levels, radiation levels, flows, the status of such components as valves (opened or closed) and pumps (on or off) and additional parameters which are calculated from one or more directly measured parameters. The devices which measure on a real time basis the parameters used in connection with the specific embodiments of the present invention to be described hereinafter are shown in FIG. 1. These devices are of two types: numerical reading instruments and logic devices. They are indicated in the figure by a circle enclosing a letter representative of the type of reading which is taken at the indicated location. The following is a legend for the readings taken by the numerical type measuring devices:

F=flow
L=level
P=pressure
R=radiation
T=temperature

Symbols for the logic type devices indicate the following:

A=available
B=circuit breaker
S=status

The available indication is used in connection with the condenser 13 and is an indication of the availability of the condenser as a heat sink. This condition is already calculated in PWR plants for other purposes from temperature and pressure readings and is available in the form of the state of a static switch. The circuit breaker logic signals are used to indicate the status of valves and pumps and indicate whether power has been applied to operate the associated component. For instance, if the circuit breaker associated with a pump is closed, the logic element will be set to true indicating that power is applied to the pump motor. The status logic signals are used in connection with, for instance, the atmospheric dump valve selector 20 to indicate whether the system is in automatic or manual mode.

While single sensors are shown in FIG. 1 for clarity, in reality redundant devices are used for each reading for reliability. The multiple readings are processed in a manner well known in the instrumentation art to generate the value used for system control and analysis. Furthermore for some of the signals which vary over wide ranges, separate groups of sensors each adapted to provide accurate readings in a particular part of the overall signal range are utilized. For instance, the reactor power level varies over such a wide range that source range instrumentation is provided for measuring power at and near shutdown, power range instrumentation is provided for use at full power and intermediate range instrumentation is used at power levels inbetween. In addition, for some measurements, such as reactor vessel liquid level and steam generator level, narrow range instrumentation for providing accurate readings in the normal operating range is provided in addition to full range instrumentation. In these cases, redundant instrumentation is provided just as in the case of single range instrumentation.

Figure 2:
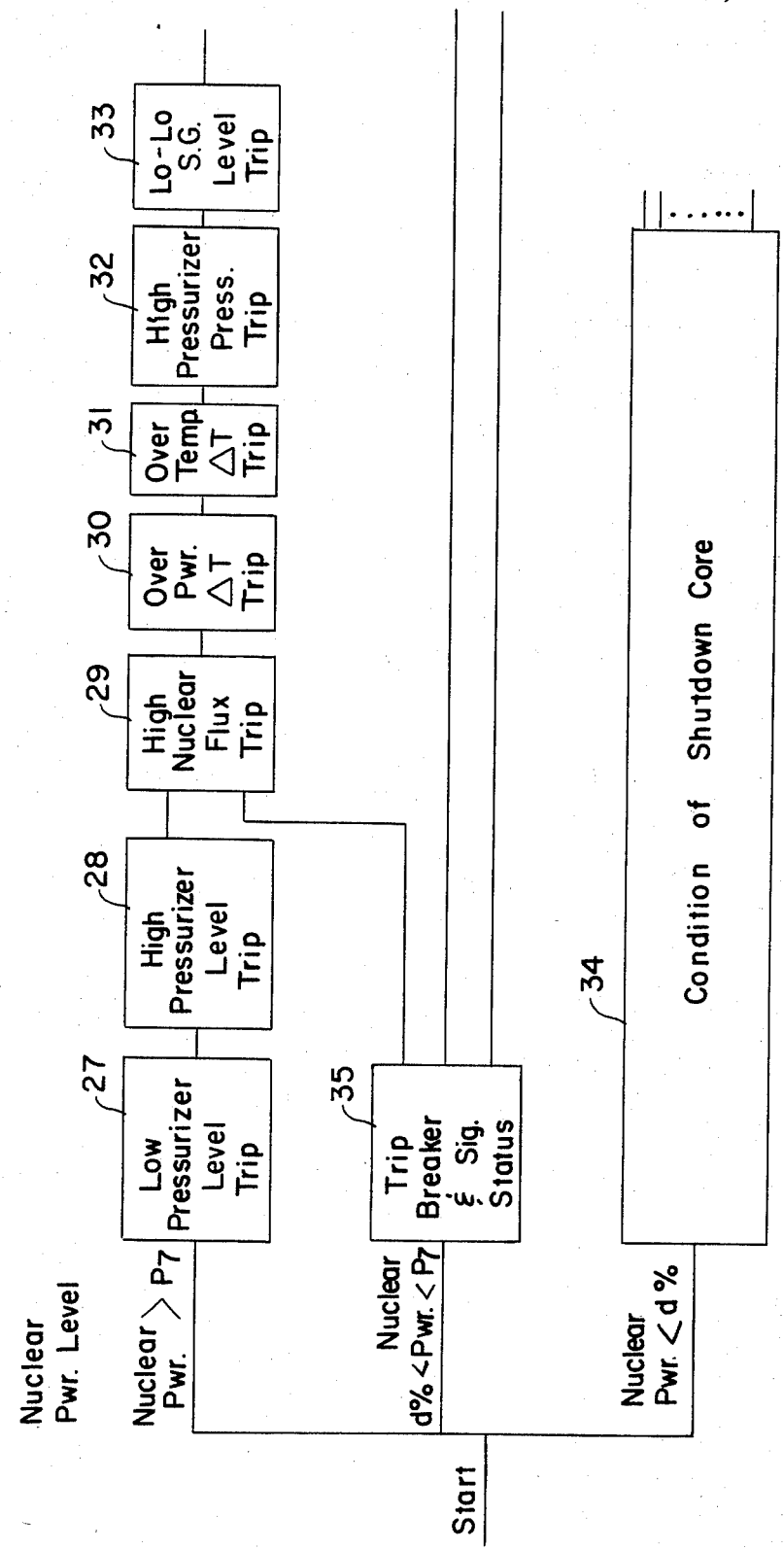
FIG. 2 is a schematic diagram in block diagram form of a status tree in accordance with the invention for monitoring the operation of the power generating system shown in FIG. 1.

The first embodiment of the invention to be described utilizes a status tree approach to monitor the operation of the Nuclear Steam Supply System illustrated in FIG. 1 and is referred to as the Disturbance Analysis System (DASS). A block diagram of the overall arrangement of the particular decision tree used is shown in FIG. 2. This decision tree is divided basically into three broad areas based upon the power level of the reactor which is the first parameter that is examined in the sequence. The power level is determined by measuring the neutron flux escaping from the reactor core 1. If the power level is above a nominal level for operation $P_7$ (typically 15%) the reactor is at power, if the radiation level is below a preset level d (typically 0–1% depending upon plant instrumentation) the reactor is shutdown, and if the power level is in between, the reactor is either in transition coming up to power or going down from power in a controlled shutdown, or else it has not shutdown in response to a reactor trip.

When the plant is at power, that is the nuclear power level is above $P_7$, this first embodiment of the invention monitors the margin to each of the reactor trips. These margins to trip are analyzed in the sequence indicated in FIG. 2 as follows: Low Pressurizer Pressure Trip block 27, High Pressurizer Level Trip block 28, High Nuclear Flux Trip 29, Over Power T Trip block 30, Over Temperature T Trip block 31, High Pressurizer Pressure Trip block 32, and Lo-Lo Steam Generator Level Trip block 33. These are all typical trips for a PWR plant which are already generated by the plant protection systems. If the plant is shutdown, a separate branch of the status tree as indicated by block 34, is entered to monitor the condition of the core. When the power level is inbetween, the status of the trip breaker and trip signal is monitored as indicated in block 35.

Figure 3:
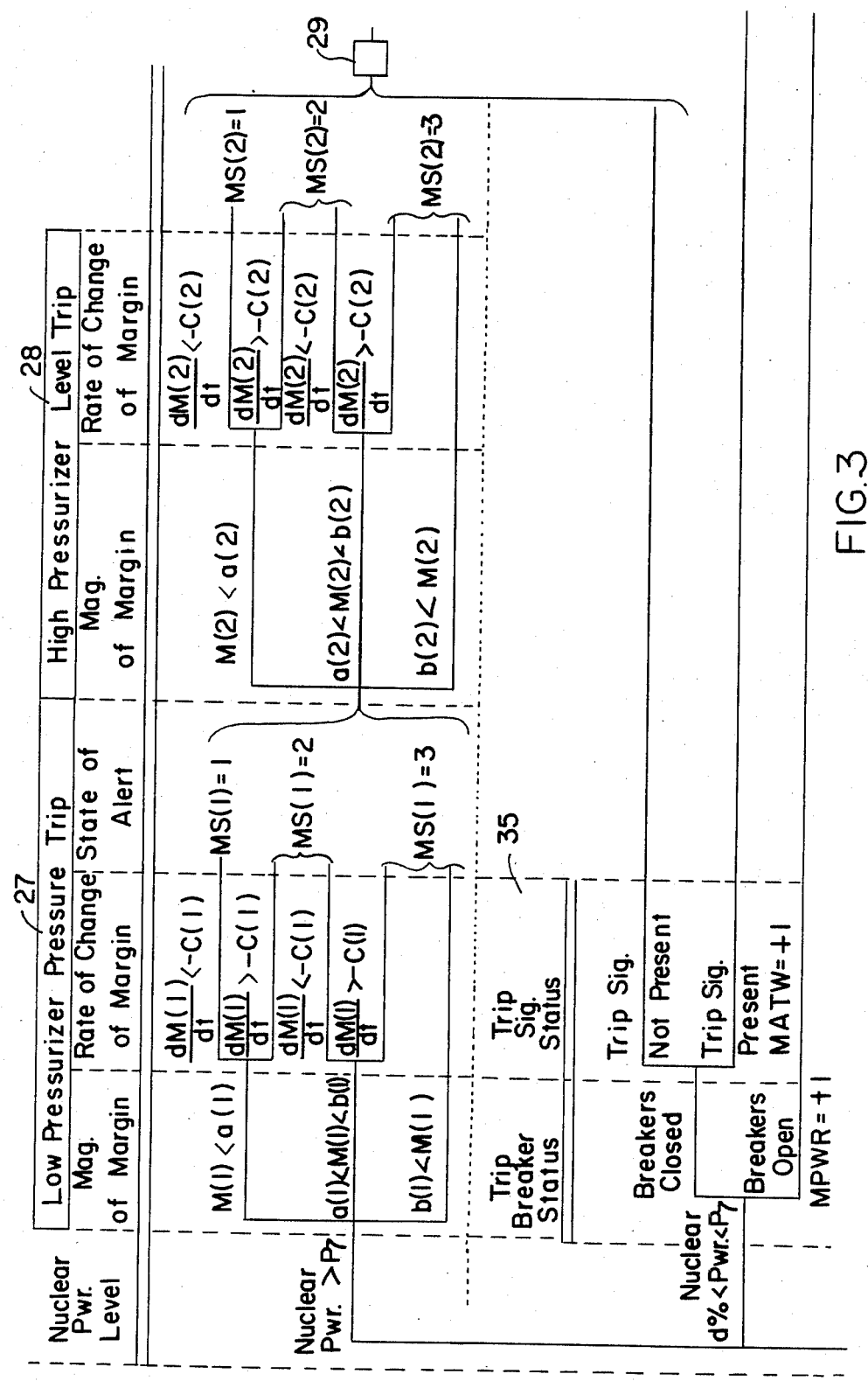
FIGS. 3 and 4a, b and c are diagrams showing in more detail portions of the status tree illustrated in FIG. 2.

FIG. 3 illustrates in more detail a portion of the status tree of FIG. 2 related to the trips and to the trip signal and breaker status. As previously indicated, the status tree is divided into columns which represent the parameters, measured or calculated, to be examined in the sequence indicated beginning at the left, and horizontal line segments in each column. The horizontal lines entering a column from a preceeding column on the left split into a number of horizontal lines each representative of a selected range of values for that parameter. If the value of that parameter is immaterial to the particular path through the tree, the horizontal line extends straight across the column to the next column on the right.

In monitoring each of the trips, a "margin to trip" and the "rate of change of the margin" are examined and a "state of alert" is set depending upon those values. The "margin to trip" is the absolute magnitude of the difference between the compensated value of the measured or calculated parameter and the set point value for the trip in question. Details of the algorithms for computing the current value of a calculated or measured and compensated parameter are given in the Final Safeguards Analysis Report and in the Plant Technical Specifications prepared for each nuclear plant. These are public documents with which those skilled in the art are fully familiar. The set point values for each trip are also listed in the Plant Technical Specifications. Inputs used in calculating parameter values for the trips shown in FIG. 2 include: pressurizer pressure, hot and cold leg coolant temperatures, pressurizer level, reactor power level, steam generator levels and turbine impulse chamber pressure. The "rate of change" of a parameter or variable such as the "margin to trip" is computed by making a linear least squares fit to the set of the (typically) five most recently observed or computed values of the parameter or variable in the form $$\text{var(time)} = \alpha + \beta \times \text{time}$$

and equating the "rate of change" to the value of the slope factor, $\beta$.

The "state of alert" for each trip is an indicator which is assigned a numerical value dependent upon the degree of challenge that system status presents to the pertinent protection system. These values are assigned as follows:

1—Impending Challenge to the Protection System
2—Potential Challenge to the Protection System
3—No Current Challenge to the Protection System The indicators are identified as MS(k), k=1, 7, where the value of k corresponds to the particular reactor trip being considered.

Returning to FIG. 3, when the nuclear power level is greater than $P_7$, the range of the magnitude of the pressurizer margin to a low pressure trip is determined. If the margin is less than a first set point value a(1) indicating that the margin is approaching the protection system trip set point, the rate of change of the margin is compared to a set point value—c(1). If the rate of change is less than—c(1), indicating that the margin is getting smaller at more than a predetermined rate, the "status alert" MS(1) associated with the low pressurizer pressure trip is set to "1" as a warning that there is an impending challenge to that protection system. If, on the other hand, the margin is less than a(1) but the rate of change of the margin is more positive than—c(1), MS(1) is set equal to "2" to indicate that there is only a potential challenge to the protection system. As is evident from FIG. 3, if the "margin to trip" is more than a(1) but less than b(1), there is only a potential challenge if the rate of change of the margin is more negative than—c(1) and no challenge if it is more positive than—c(1). Finally, if the margin is greater than b(1), there is no need to check its rate of change since there is no current challenge. It can be appreciated that each of the other trips are examined in a similar manner with the appropriate state of alert being set as determined by the comparison of the margin and rate of change of the margin with the corresponding set point values. Thus for each trip, a "status alert" will be generated indicative of the current status of a challenge to the associated protection system.

For the Trip Breaker and Signal Status portion of the status tree as represented by block 35 in FIG. 2 and the Condition of Shutdown Core, block 34, a different system for indicating abnormal conditions is used from that discussed above in connection with the margin to trip "status alerts". A number of conditions which represent significant abnormal or off-normal conditions of which the operator, and if desired the automatic control system, should be aware have been selected. As the decision tree is worked through, indicators are set to preselected numerical values which categorize the status of the selected conditions. The numerical values are as follows:

+1 The Off-Normal Condition Definitely Exists
−1 The Off-Normal Condition May Exist
0 The Off-Normal Condition Does Not Exist The indicators are represented in the form IND(M), M=1, 17, where M signifies the particular selected conditions. A typical set of Off-Normal Condition Status indicators is as follows:

TABLE A

|  | Mnemonic | Off-Normal Condition |
| --- | --- | --- |
| IND(1) | MPWR | Plant has returned to power after a TRIP |
| IND(2) | MATW | TRIP failed to occur when called for |
| IND(3) | MIH | High coolant inventory |
| IND(4) | MIL | Low coolant inventory |
| IND(5) | MILL | Low-Low coolant inventory |
| IND(6) | MIIN | Inadequate coolant inventory |
| IND(7) | MVUH | Void in upper head |
| IND(8) | MVSG | Void in steam generator tubes |
| IND(9) | MLSS | Net loss of coolant from RCS |
| IND(10) | MLKG | Continuing leakage of coolant from RCS |
| IND(11) | MPOP | RCS overpressurization |
| IND(12) | MPHH | High-High RCS pressure |
| IND(13) | MPH | High RCS pressure |
| IND(14) | MSAT | Reactor coolant at saturation temperature |
| IND(15) | MINE | Ineffective core cooling |
| IND(16) | MINA | Inadequate core cooling |
| IND(17) | MNHS | No heat sink available |

All of the indicators are set equal to zero before each run through the status tree.

As indicated in the status tree of FIG. 3, when the power is above shutdown level, d%, but below operating level, $P_7$, the trip breaker status is checked. If the breakers are open indicating that the reactor has been tripped, MPWR (IND(1)) is set equal to +1 as a signal that the plant has returned to power after a trip. If the breakers are closed, indicating that the reactor has not been tripped, then the trip signal status is checked. If the trip signal status is present, MATW (IND(2)) is set equal to +1 to signal that a trip has failed to occur when called for. If no trip signal is present, the system is either going through start-up or a controlled shutdown and the trips of blocks 29 through 33 are examined in sequence.

Figure 4A:
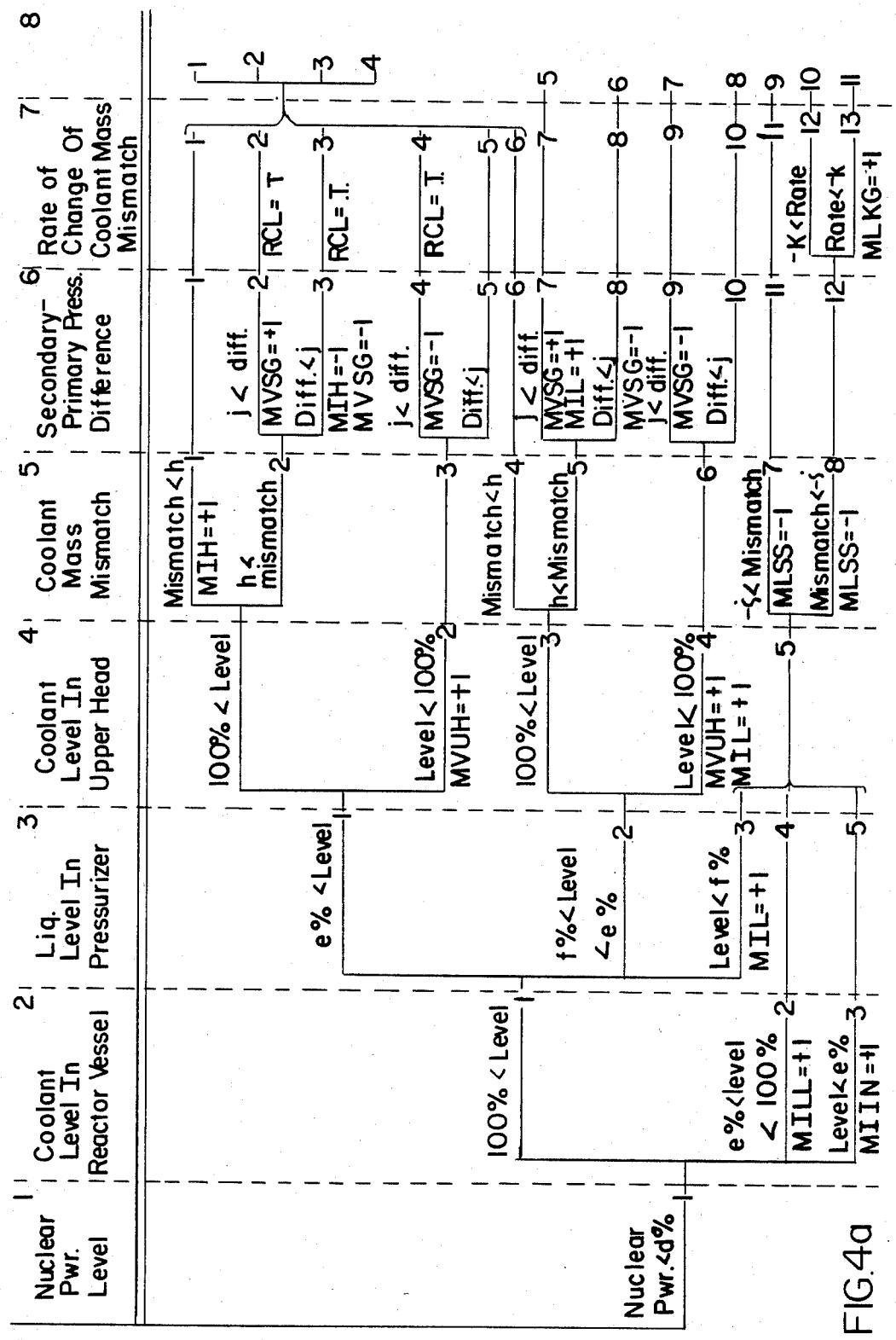

FIGS. 4a, b and c illustrate in detail the portion 34 of the status tree of FIG. 2 dealing with the condition of the shutdown core. In this portion of the tree each column represents a measured or calculated parameter to be examined in sequence. For ease of identification each column is numbered from left to right and the branches in each column are numbered down the right side from top to bottom. Thus any particular branch in the tree can be identified by two numbers: the first indicating the column and the second the branch within that column.

The parameters examined in columns 1 through 4 of FIG. 4a are measured parameters the identification of which is clear from the description given. The coolant mass mismatch considered in column 5 is a calculated parameter. The current value of this parameter is determined by considering a control volume consisting of the reactor vessel 2, the main piping of the reactor coolant system 5 and 8, the pressurizer 9 and the primary side (tube side) of the steam generators 6 and estimating the mass of the reactor coolant within the control volume in two different ways. In the first method, the "indicated mass" is evaluated by converting the liquid level indications available for the pressurizer 9 and reactor vessel 2 into masses of liquid plus vapor in these two volumes, taking into account the effects of measured pressure and temperature on the liquid and vapor density, and, depending on the liquid level in the reactor vessel, assuming that the piping and steam generator tubing either is filled solid with water of calculable density or is empty. In so doing account is not made for possible vapor volume in the primary side of one or more steam generators when the system is assumed to be filled with water.

In the second method of estimating the mass of reactor coolant within the control volume, water additions through charging flow and safety injection flow and water removals by letdown flow are monitored and integrated to determine the net mass of water added or removed since some reference point in time at which a reference coolant mass value was established. The current mass in the system is then assumed to be the reference mass plus the net added mass (which may be a negative quantity). In so doing, no account is made for the mass flow of water lost from the system by flow through breaks in the reactor coolant pressure boundary or by release through the pressurizer safety or relief valves.

The "coolant mass mismatch" is the algebraic difference between the "indicated mass" of the first method and the "calculated mass" obtained by the second method. If the mismatch is a positive quantity, the presence of void (actually vapor) volume in the steam generator tube side is indicated. If the mismatch is a negative quantity, the loss of coolant through abnormal openings is indicated.

The "secondary-primary pressure difference" of column 6 is also a calculated parameter and is the algebraic difference between steam pressure in the steam generators and reactor coolant pressure. It is an indirect mode of confirming or inferring that void volume exists on the primary side of the steam generators. Pressure correlates directly with temperature on the secondary (shell) side of the steam generators and on the primary (tube) side if a vapor volume has formed on the tube side. Hence, if the secondary-primary pressure difference is positive, the shell side is hotter than the tube side and the potential exists for the formation of a void volume on the tube side. If the pressure difference is negative, the tube side is the hotter and any vapor existing on the tube side will eventually condense.

Figure 4B:
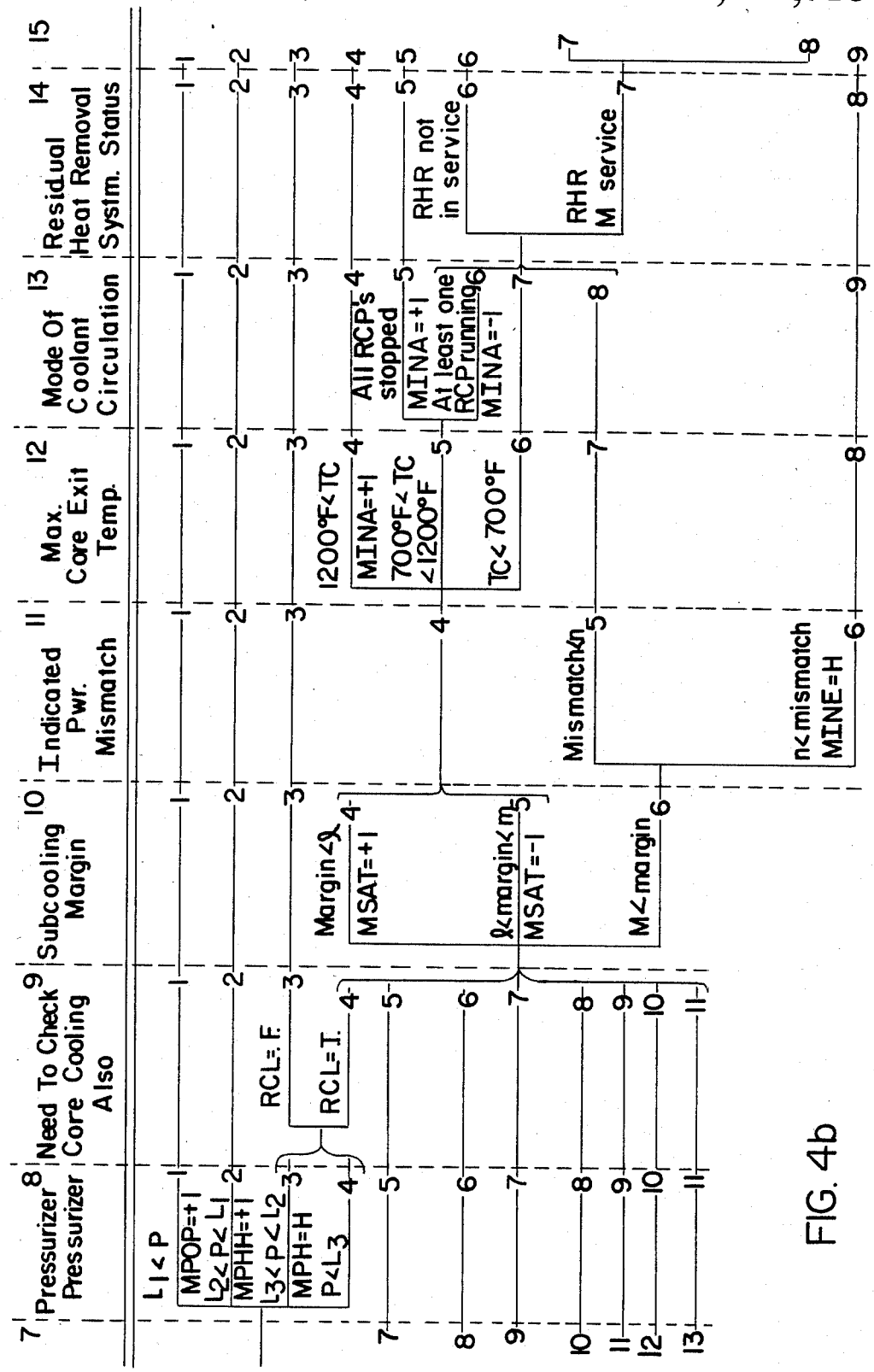

The calculated parameter of column 7 is the rate of change of the "coolant mass mismatch" of column 5 and is determined using the least squares method discussed above. If the mismatch grows progressively more negative, continuing loss of coolant is indicated. The pressurizer pressure of column 8 (FIG. 4b) is self-explanatory. In column 9 the determination is made whether the core cooling aspects of the NSSS status need to be considered as well as over pressurization aspects. The first 8 columns of the status tree all deal with the overpressurization aspects. The determination is made on the basis of the path by which column 9 is reached. In most cases, as a particular branch through the status tree is developed, it becomes evident that either overpressurization or core cooling is the only significant concern. In a relatively few cases, both overpressurization and core cooling are valid concerns. Those paths include branches 2, 3 or 4 of column 7 wherein RCL was set equal to true and either branch 3 or 4 of column 8.

The sub-cooling margin" of column 10 is also a calculated parameter and is the algebraic difference between the saturation temperature that corresponds to the existing pressure in the reactor coolant system (represented by the pressurizer pressure) and the core exit reactor coolant temperature indicated by the core exit thermocouples. A positive value of the sub-cooling margin indicates that the reactor coolant is sub-cooled and single phase in the vessel. A negative value of the sub-cooling margin indicates that the coolant leaving at least some regions of the reactor core is in the form of superheated steam and that core cooling is impaired.

The "indicated power mismatch" of column 11 is calculated as follows. The rate of release of decay heat in the shutdown reactor core as a result of radioactive decay of fission products is calculated with reasonable accuracy as a function of core power history prior to shutdown and of elapsed time since shutdown. Under various conditions of reactor coolant flow (natural circulation with all reactor coolant pumps 6 stopped, forced circulation with 1 to N pumps operating) the temperature rise in the coolant from core inlet (or reactor vessel inlet) to core exit (or reactor vessel exit) is calculated as a function of the rate of release of decay heat. Thus, coolant temperature rise as a function of elapsed time after shutdown and of the number of pumps operating is predicted with reasonable accuracy. This can also be determined empirically from controlled experiments. The amount of the temperature rise as the coolant passes through the core at any time after shutdown is also observed by direct measurement. The power mismatch is then the difference between the amount of temperature rise actually observed in the coolant in passing through the core and the amount of the rise predicted for the conditions under which the observation was made. If the observed temperature rise is significantly larger than the predicted value, it can be inferred either that the coolant is not fully effectual in cooling the core due perhaps to degradation of the core geometry or that the core is generating direct nuclear power by fission as well as by radioactive decay.

The "Maximum Core Exit Temperature" of column 12 is self-explanatory. The "Mode of Coolant Circulation" of column 13 is an indication of whether any reactor coolant pumps 6 (see FIG. 1) are operating, as represented by their breaker status, or whether circulation is by convection. The "Residual Heat Removal System Status" of column 14 (FIG. 4c) is indicated by the status of the breakers for the valves 23 which divert the reactor coolant through the residual heat removal heat exchanger 22. The operation of that system is indicated in column 15 by the temperature of the coolant measured by the core exit thermocouples. The parameters of columns 16 to 20 are easily understood from their titles.

As the parameters in columns 1 through 20 of FIG. 4 are compared in sequence to set point values and the ranges of the measured or calculated parameters are determined, a path is generated through the status tree which is representative of the current status of the system. Some of the parameters are compared with more than one set point value at a given branch point. For instance, the liquid level in the reactor vessel, column 2, is compared with the 100% level setpoint and another lower setpoint value e% which is selected dependent upon the specific design of the particular plant. Thus three selected branches emanate from this branch point. Other parameters are compared with different set point values dependent upon the path by which the associated column is reached. As an example, the calculated parameter "Coolant Mass Mismatch" of column 5 is compared with a setpoint value "h" if column 5 is reached through branches 1 or 3 of column 4 while it is compared with setpoint value "s" if it is approached through branch 5 of column 4.

In working through the status tree, as enough information is gathered to make a determination about any of the preselected abnormal conditions the corresponding indicator is set to the appropriate value. Thus at column 2 branch 2, if the reactor vessel coolant level is less than 100% but more than e%, indicator MILL (IND(5)) is set equal to +1 indicating that a low-low (very low) coolant inventory condition exists. At some points, more than one indicator is set. For instance, at column 4 branch 4, MVUH (IND(7)) is set equal to +1 to signal the existence of a void in the upper reactor vessel head and MIL (IND(4)) is set equal to +1 to indicate low coolant inventory. If column 7 is reached through branches 2, 3 or 4 of column 6, then logic parameter RCL is set equal to .T. (true). Thus when column 9 is reached and the determination is made as to whether core cooling should be considered as well as overpressure, the answer will be yes and branch 4 will be selected so that the sub-cooling margin and the remaining parameters in the tree can be considered as necessary.

When a path through the tree of FIG. 4 has been completed, it is possible that all of the selected indicators will remain at a value of zero indicating that the reactor has shutdown satisfactorily. It is also possible, however, that one or more of the indicators will have values of +1 or −1 indicating the existence or possible existence of abnormal conditions. The values of these indicators can be presented to the operator for information and appropriate action where necessary and/or they can be used by the automatic control system to take steps to guide the system toward normal conditions.

Figure 5:
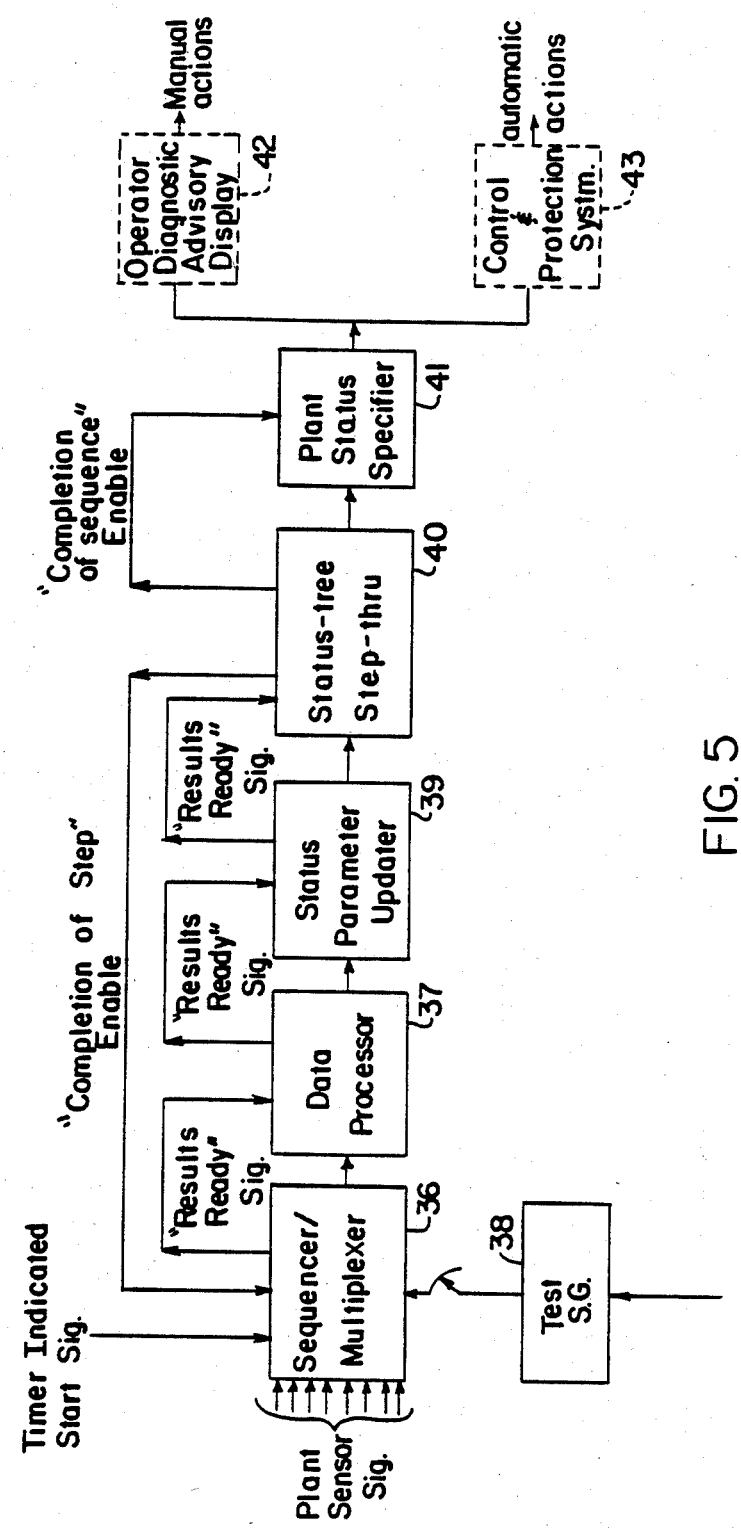
FIG. 5 is a functional block diagram of a system for carrying out the status tree analysis of FIGS. 2 through 4c utilizing a programmable digital computer.

The analysis discussed in FIGS. 2 through 4 can be implemented through the use of a system incorporating a programmable digital computer. Such a system is functionally set forth in the block diagram of FIG. 5. The system includes a Sequencer/Multiplexer 36 which selects in a prescribed order sets of signals from the sensors discussed in connection with FIG. 1, converts them into suitable form for numerical processing and passes each sensor response on to a Data Processor 37. Associated with the Sequencer/Multiplexer 36 is a Test Signal Generator 38 that provides, on demand, simulated sensor response signals representative of selected off-normal conditions in order to permit periodic testing and verification of the performance of the system.

The Data Processor 37 accepts the raw sensor signals from the Sequencer/Multiplexer 36, tests them for validity, applies prespecified calibration and correction factors, converts the results into equivalent engineering unit values, also in accordance with known procedures, and passes the results to the Status Parameter Updater 39. The Status Parameter Updater 39 utilizes information passed on by the Data Processor 37 to reevaluate or update the value of the status parameter to be used in the next stage of evaluation of the plant status. This includes the updating of the calculated parameters and is carried out in analytical or numerical form using the principles discussed previously in connection with FIG. 4. The updated parameter values are then passed on to the Status Tree Step-Thru module 40 which generates a path through the status tree and sets the appropriate indicators in the manner discussed above.

By introducing a master timer (not shown in FIG. 5) to control the transmitting of information from module to module in the chain from the Sequencer/Multiplexer 36 to the Status Tree Step-Thru module 40, it is practical to have all four modules operate concurrently such that, for example, as soon as the Sequencer/Multiplexer 36 passes one group of sensor response signals to the Data Processor 37, it sequences to the next group of sensors and begins to prepare their outputs for transmission to the Data Processor. Thus, while the Status Tree Step-Thru module 40 is at column N, the Sequencer/Multiplexer is already acting on the sensor responses that will provide the status parameter value needed at column N plus 2 and the Status Parameter Updater 39 will be generating the status parameter value used at column N plus 1. The net result would be a decrease in computer running time of a factor of nearly four.

Figure 9:
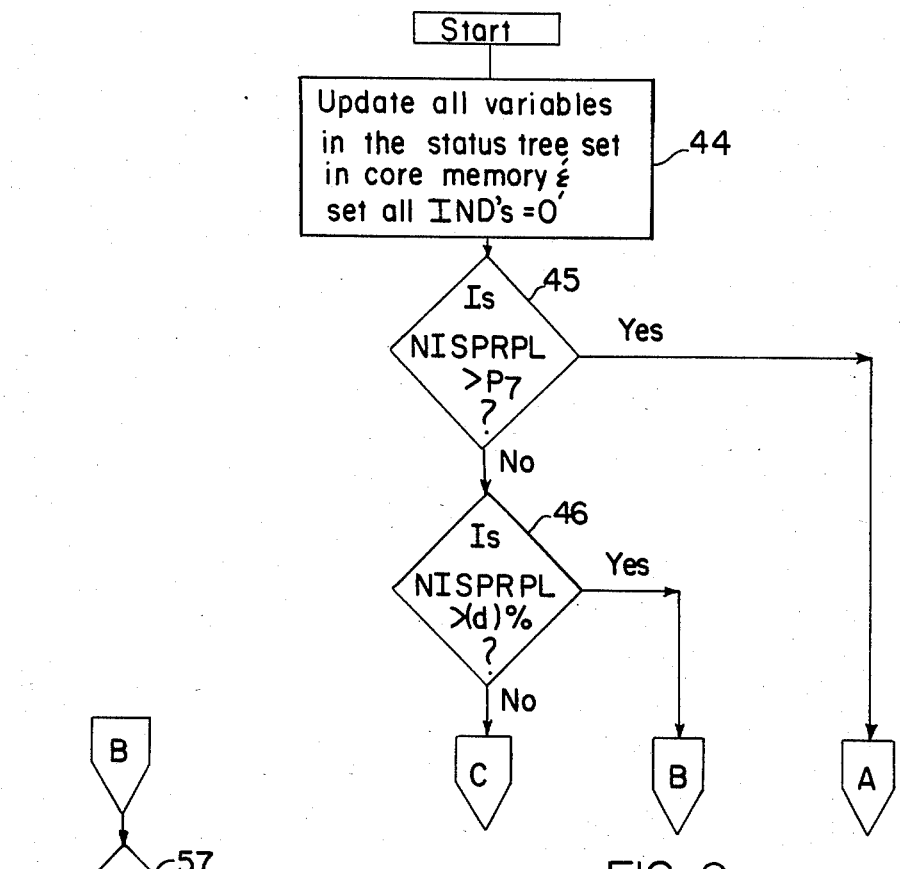
FIGS. 9 through 13 are flow charts suitable for performing the analysis represented by the status tree of FIGS. 2 through 4.

A plant Status Specifier module 41 accepts the margin to trip and indicator values generated by the Status Tree Step-Thru module 40 and selects an appropriate set of prioritized information displays for presentation to the operator as indicated in module 42. These displays may be generated by a line printer or by a CRT. If desired, the Plant Status Specifier 41 can also generate an appropriate set of prioritized actions for recommendation to the operator in module 42 or for automatic implementation by the plant control and protection systems 43. A suitable set of displays is illustrated in FIGS. 6 and 9. FIG. 6 shows a typical display generated when the unit is operating at 100% power. Since the margin status of "1" for the High Pressure Level trip indicates that there is an impending challenge to this protection system, this portion of the display is flashed when presented on a CRT to bring the operator's attention to it. FIG. 7 illustrates a display which could be generated when the unit has not shutdown following a trip. Such a display would be generated by the MATW indicator being set equal to "1". FIG. 8 shows a display which lists a possible combination of off-normal conditions with the Definitely Identified Conditions listed first followed by the Possible Conditions.

Flow charts for a suitable program for carrying out the status tree analysis of FIGS. 2 through 4 and for generating the displays of FIGS. 6 through 8 are set forth in FIGS. 9 through 13.

The following is a legend of the symbols used for the various parameters where NIS referes to Nuclear Instrumentation System:

TABLE B

| | |
|---|---|
| NIS Power Range Power Level (% of full power) | NISPRPL |
| NIS Intermediate Range Startup Rate (decades/minute) | NISIRSU |
| NIS Source Range Startup Rate (decades/minute) | NISSRSU |
| NIS Source Range High Voltage (volts) | NISSRHV |
| Maximum Core Exit Thermocouple Temperatures (°F.) | CETCTMP |
| Reactor Coolant System (PRZR) Pressure (psia) | PRZRPRE |
| Pressurizer Liquid Level (% of span) | PRZRLVL |
| Each Reactor Coolant Pump Breaker Status (ON/OFF) .T. = ON | RCPBRS(N) |
| Reactor Vessel Liquid Level-Narrow Range (% of full range) | RVNRLVL |
| Reactor Vessel Upper Head Liquid Level (% of full range) | RVUHLVL |
| Residual Heat Removal System Inlet Valve Status (Train m) (Open/Closed) .T. = open | RHRTmV1 RHRTmV2 |
| Each Steam Generator Steam Pressure (psia) | SGSPRE(N) |
| Each Steam Generator Narrow Range Level (% of full range) | SGNRLV(N) |
| Reactor TRIP Breaker Status (Closed/open) .T. = open | TRIPBRS |
| Reactor TRIP Signal Status (P4 bistable) (High/Low) .T. = signal high | TRIPSIG |

Figure 10:
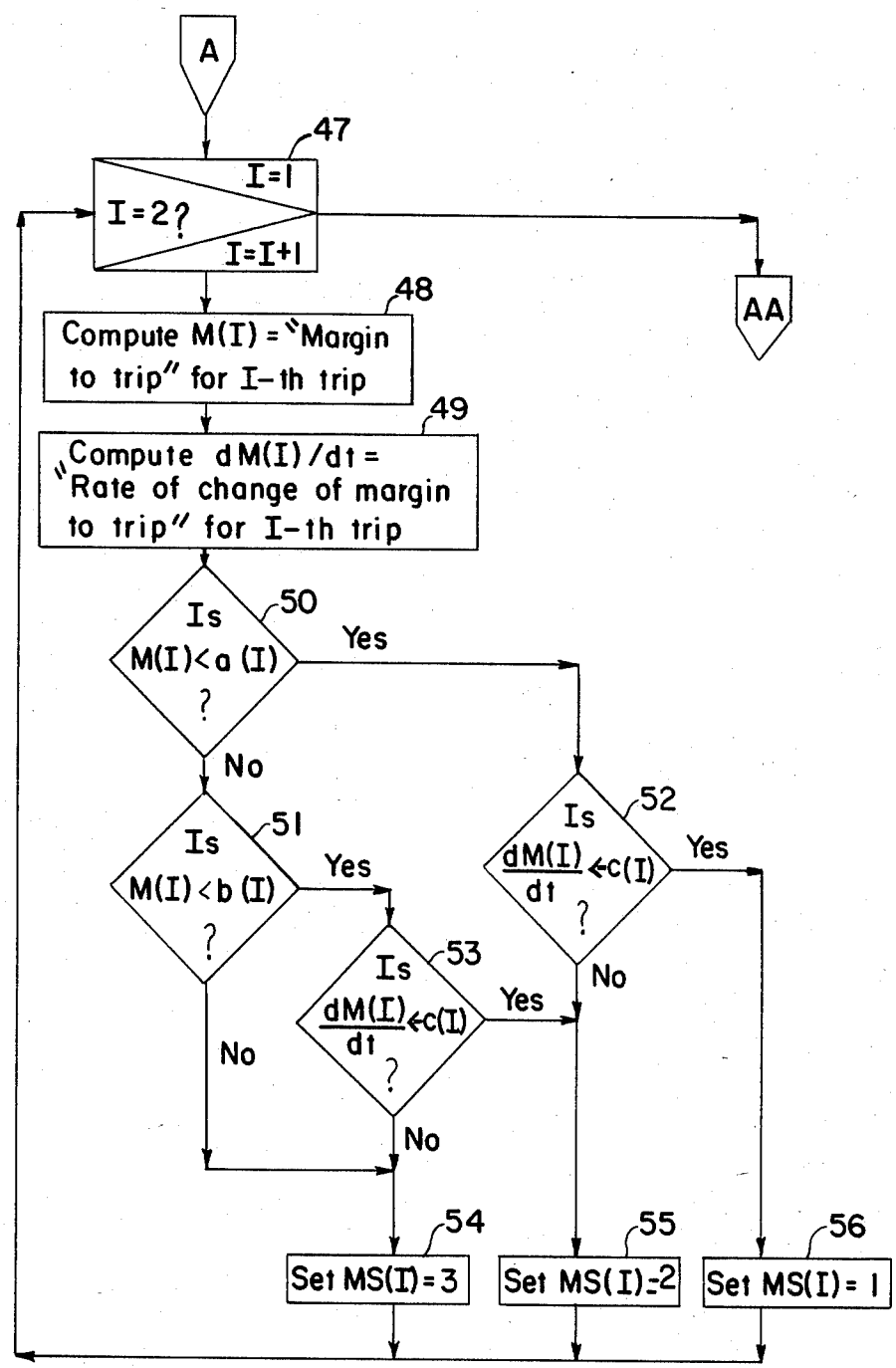

As illustrated in block 44 of FIG. 9 the first step is to update all variables, both measured and calculated and to set all the off-normal condition indicators INDs equal to "0". A determination is then made in blocks 45 and 46 of the power range of the reactor. If the reactor is at power, FIG. 10 is entered. In block 47, I is set equal to "1" where I represents the margins to trip with I(1) being the designation for the Low Pressurizer Pressure Trip. The margin to trip and the rate of change of the margin to trip are then computed in blocks 48 and 49 respectively. Following this, the margin to trip is compared with the set point value a(1) in block 50 and possibly b(1) in block 51 and the rate of change of the margin to trip is compared, if required, with the set point value −c(1) in blocks 52 or 53 to generate the appropriate Margin to Trip Status MS(1)=1, 2 or 3 in blocks 54, 55 and 56 respectively, all in accordance with the logic discussed in connection with FIG. 3. The program then loops back to block 47 where I is indexed to I+1 and the sequence is repeated for generating the status of the High Pressurizer Level Trip. This time when the program loops back to block 47 it exits through AA.

Figure 11:
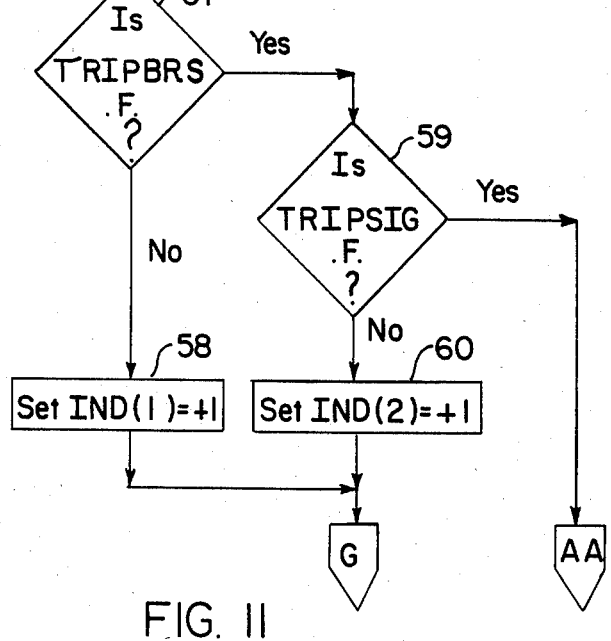

If in FIG. 9 the power is above d% but below the $P_7$ level, FIG. 11 is entered. If as indicated by block 57 the trip circuit breaker logic is not set to false indicating that the breaker is open and therefore the reactor has been tripped, the MPWR indicator IND(1) is set equal to +1 in block 58 indicating that the reactor has returned to power after a trip. If the breaker logic is set to false but the trip signal logic is set to true as verified in block 59, indicator IND(2) is set equal to +1 in block 60 to signal that the trip failed to occur when called for. In either case the status tree analysis program is finished. On the other hand, if the trip signal logic is set to false the routine is exited at AA.

Figure 12:
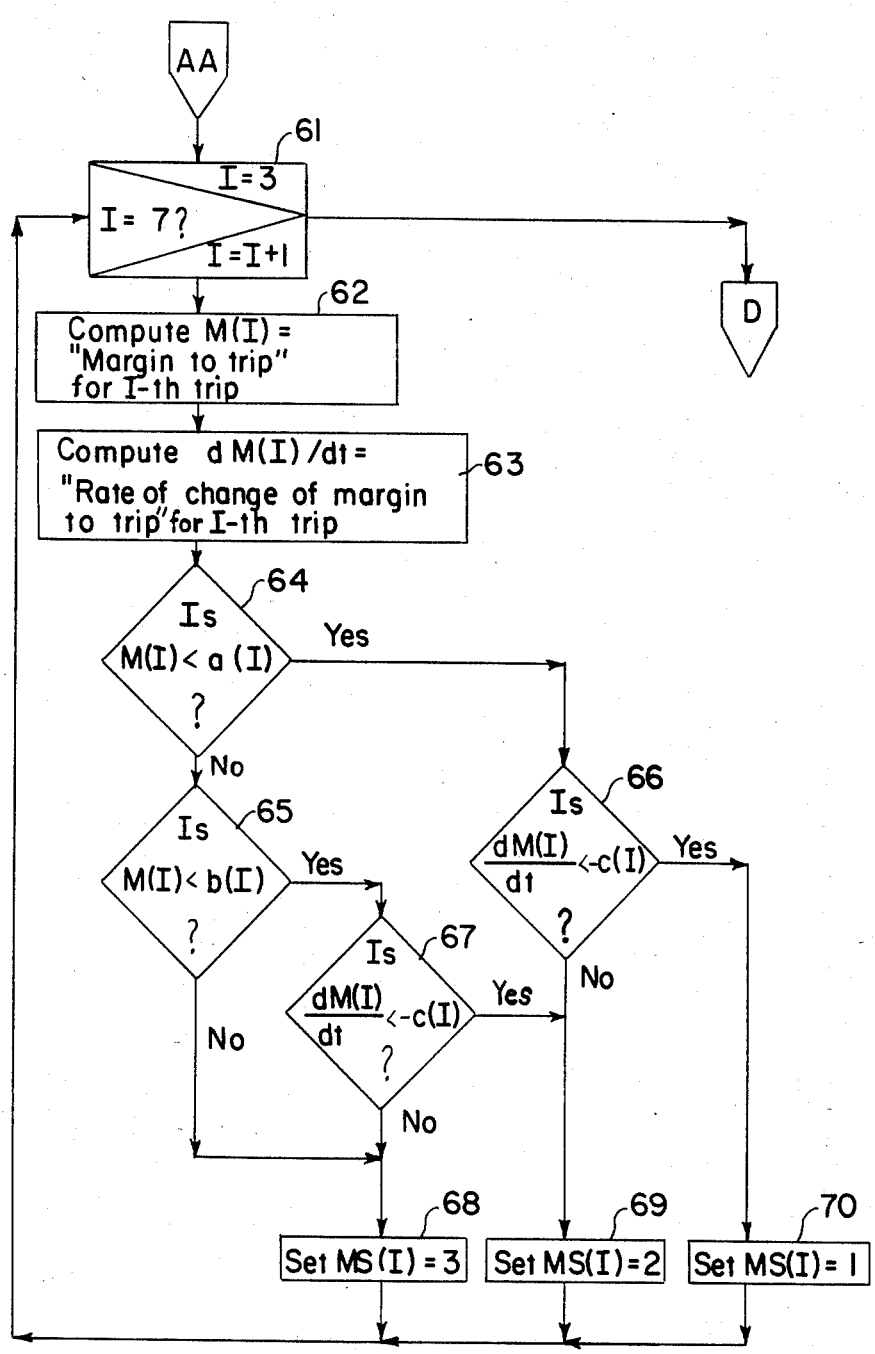

Upon the completion of the routine in FIG. 10, or upon exit of the routine in FIG. 11 at AA, the routine of FIG. 12 is entered to generate the status of the remaining margins to trip set forth in blocks 29 to 33 of FIG. 2. The routine of FIG. 12 functions similarly to that in FIG. 10 by looping from I equals 3 representing the High Nuclear Flux Trip to I equals 7 corresponding to the Lo-Lo Steam Level Trip as indicated by block 61 with the successive margins to trip being calculated in block 62 and compared to setpoints a and b in blocks 64 and 65, the rates of change of the margins to trip being determined in block 63 and compared to setpoint −c in blocks 66 or 67 and the corresponding margins to trip status MS(I) being set to 1, 2, or 3 all as appropriate.

Figure 13:
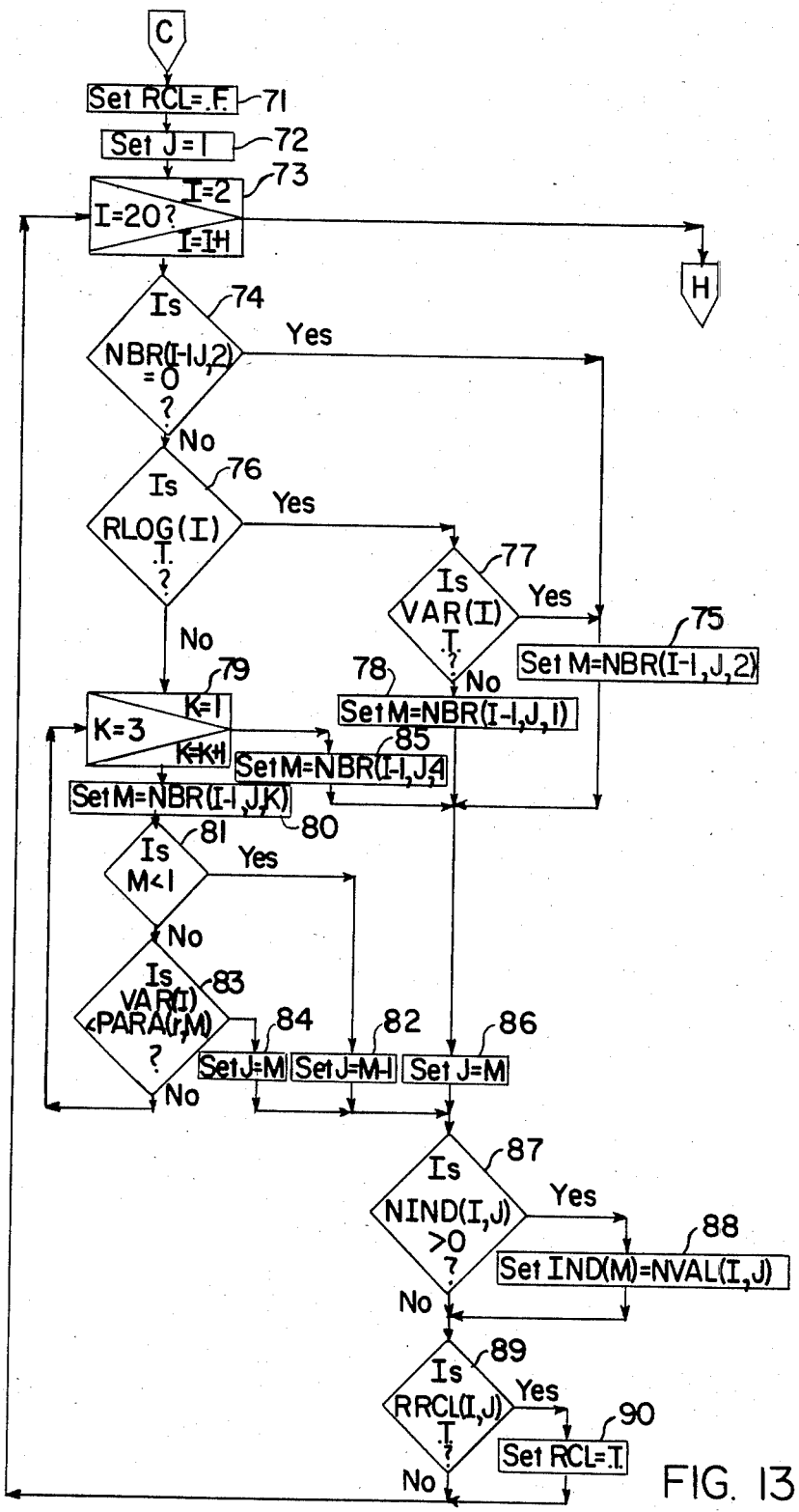

If as determined in the routine of FIG. 9, the reactor is shutdown, the routine of FIG. 13 is entered. In this routine which implements the status tree analysis of FIG. 4, a three dimensional array of integers in the form NBR(I, J, K) is used to step through the tree. I and J indicate the column and the path within the column just as in FIG. 4. K, the additional integer, identifies the paths in the next column that emanate from the end of the identified path in the indicated column. It should be noticed that the K integer will not necessarily correspond to the number given to that branch in the next column in FIG. 4, but is the number of the branch emanating from the specified path in the previous column. However, the numerical value assigned to NBR(I, J, K.) is the number of that specified branch as shown in FIG. 4. By way of example, consider the following:

NBR(4, 3, 1)=4
NBR(4, 3, 2)=5

This indicates that the two paths which branch off of the third path in the fourth column are the fourth and fifth paths in column 5. If no paths branch off of a given path then only the first branch will have a value of more than zero as seen in the following example:

NBR(4, 4, 1)=6
NBR(4, 4, 2)=0

This indicates that the fourth path in the fourth column continues as path 6 in column 5 with no branching.

Supporting this three dimensional array are several two dimensional and one dimensional arrays, as described briefly below.

VAR(20) contains the current values of the variables used in selecting branches at branch points in the several columns.

RLOG(20) contains either .T. or .F. depending on whether decisions made at branch points in the respective columns are on the basis of logical or numerical comparisons.

PARA(20, 13) contains the values of the set points associated with each path in each column. If a given path in the I-th column is merely an extension of a path in the (I-1)-th column PARA(I, J)=(arbitrary).

NIND(20,13) contains the identifying integer corresponding to the particular potentially off-normal condition that is assessed as a result of selection of the J-th path in the I-th column.

NVAL(20, 13) contains the actual numerical value to be assigned to the potentially off-normal condition described by the matching value of NIND.

IND(17) contains the numerical values used to indicate the presence, possible presence or absence of each of the off-normal conditions represented.

RRCL(20, 13) contains values of either .T. or .F. depending on whether selection of a particular path in a particular column leads to the need to consider core cooling aspects of the NSSS status as well as overpressurization aspects. In most cases, as a particular branch through the Status Tree is developed it becomes evident that either overpressurization or core cooling is the only significant concern, and the designations of the NIND values reflect this. In a relatively few cases, both overpressurization and core cooling are valid-concerns—those cases are marked by RRCL=O.T.

Referring now to FIG. 13, the logic variable RCL is set equal to false in block 71 to set up the condition that core cooling will not be checked if there is a pressurizer overpressure unless certain paths are taken through the status tree indicating that conditions exist which warrant checking both. The variable J is then set equal to "1" in block 72 so that the routine starts looking at paths from the top and I is set equal to "2" in block 73 since the parameter of the first column, Nuclear Power Level, was already considered in the routine of FIG. 9. If as determined in block 74. NBR for a second branch from the J-th path in the preceeding, I-1, column is equal to "0" indicating that that path does not branch but continues straight through the column under examination, a working variable M is set equal to NBR (I-1, J, 2) in block 75. Actually M represents the number of the path in the column of the parameter being examined in accordance with the numbering system of FIG. 4. If the path from the previous column does branch, a determination is made in block 76 whether the parameter in question is a logic or numeric variable. If it is a logic variable, and the parameter is true as determined in block 77, M is set in block 75 equal to the second branch off of the path from the previous column. If it is false, M is set equal to the first branch in block 78.

If the parameter in question is determined to be numeric in block 76, a loop is entered in block 79 to determine which branch represents the current range of the signal starting with the first branch (K=1). The working variable M is then set equal to the NBR associated with the branch in question in block 80. The value of M is then checked in block 81, to determine if there is a corresponding branch in the column. If not J, which will represent the path through which the next column is entered, is set equal to M-1 in block 82. Of course there will always be a first branch (when K=1) since even if the path from the previous column does not branch it will continue straight through the column in question. Assuming there is a K branch, the value of the parameter VAR(I) is compared with the appropriate setpoint PARA(I, M) in block 83. If the parameter value exceeds the setpoint value, J is set equal to M in block 84. Where the path does not branch, the setpoint is made equal to less than the minimum value for the parameter so that the VAR(I) will always be larger than VAR(I, M). If the parameter does not exceed the setpoint value, K is indexed in block 79 and the sequence is repeated through the remaining branches. Since the maximum number of branches emanating from any path in FIG. 4 is 4, when K is indexed to 4, this has to be the appropriate branch for the value of the parameter and hence M is set equal to NBR(I, J, 4) in block 85. Following this, and when the variable is a logic function, J is set equal to M in block 86.

Now that the path representative of the current value of the parameter under consideration has been selected, a determination is made in block 87 of FIG. 13 as to whether this branch generates an indicator representative of an off-normal condition. If it does, the appropriate indicator IND(M) is set equal to the stored value for that branch in block 88. Following this, a determination is made in block 89 as to whether reactor cooling should be considered as well as overpressurization. If so, the logic parameter RCL is set equal to true in block 90 before the routine loops back to block 73 and steps to the next column of the status tree. When all the columns have been considered, the routine is exited.

Figure 14A:
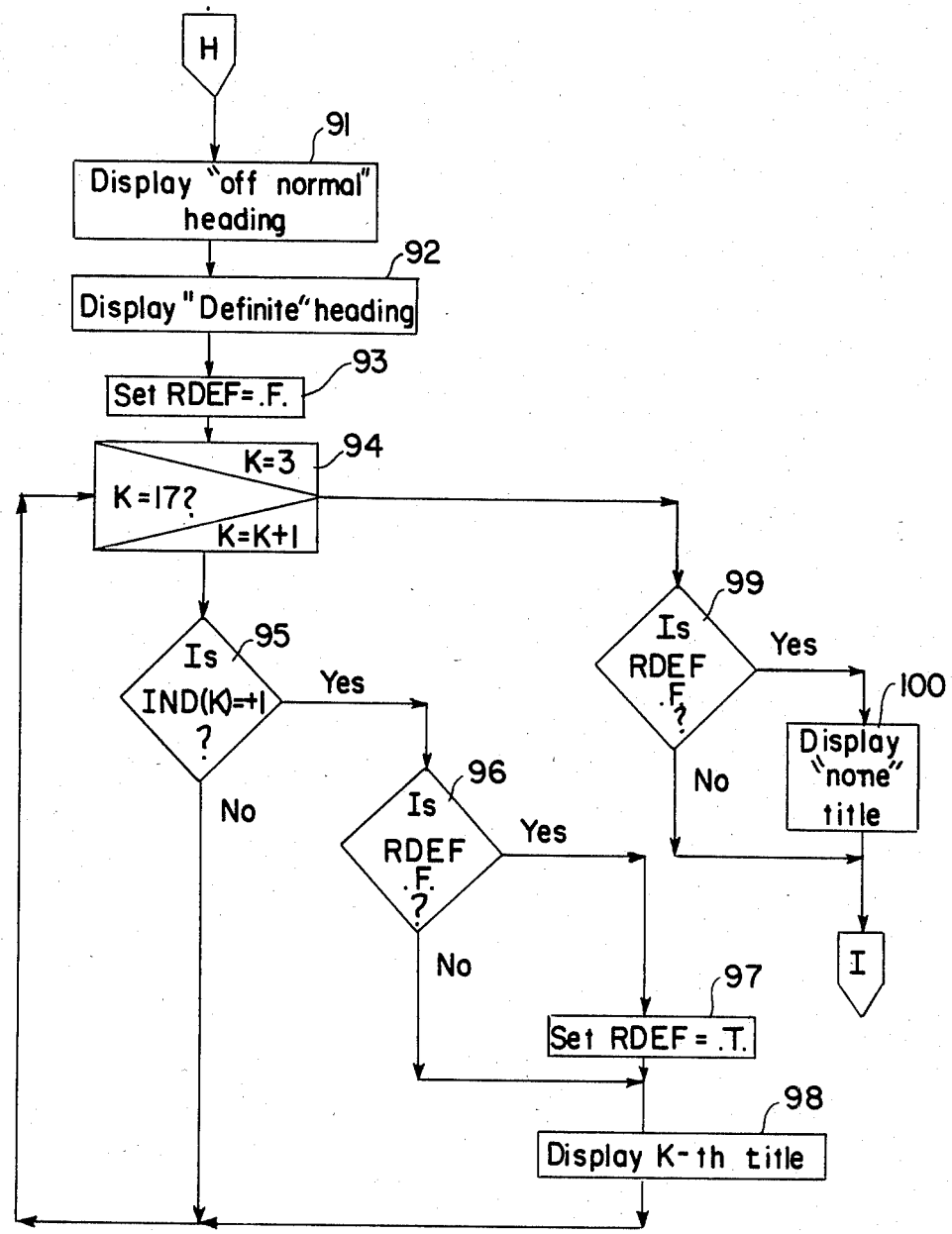
FIG. 14a and b are flow charts for generating the display shown in FIG. 8.

The visual displays such as those illustrated in FIGS. 6 through 8, which convey to the operator on a CRT the trip status or the off-normal condition status are generated in a manner such as that shown in FIG. 14 which generates a display of the type shown in FIG. 8. When the routine of FIG. 13 completes its status tree analysis of the shutdown reactor, the program transfers to the routine of FIGS. 14a and b as indicated by the tag "H". As a first step, the heading "OFF-NORMAL CONDITIONS" is generated by block 91 and the subheading, "DEFINITELY IDENTIFIED CONDITIONS", is generated at block 92. A tag RDEF is then set equal to false in block 93 to cancel the identification of definitely identified conditions from the previous run. A loop is then entered at block 94 in which each of the 17 indicators listed above are checked in block 95 to determine if they are set equal to +1 indicating that the associated condition definitely exists. If any such condition does exist, blocks 96 and 97 are used to set RDEF equal to true and the title of that condition is displayed as indicated in block 98. If after looping through all 17 indicators RDEF is still false as determined in block 99, "none" is displayed under the "DEFINITELY IDENTIFIED CONDITIONS" heading by block 100.

Figure 14B:
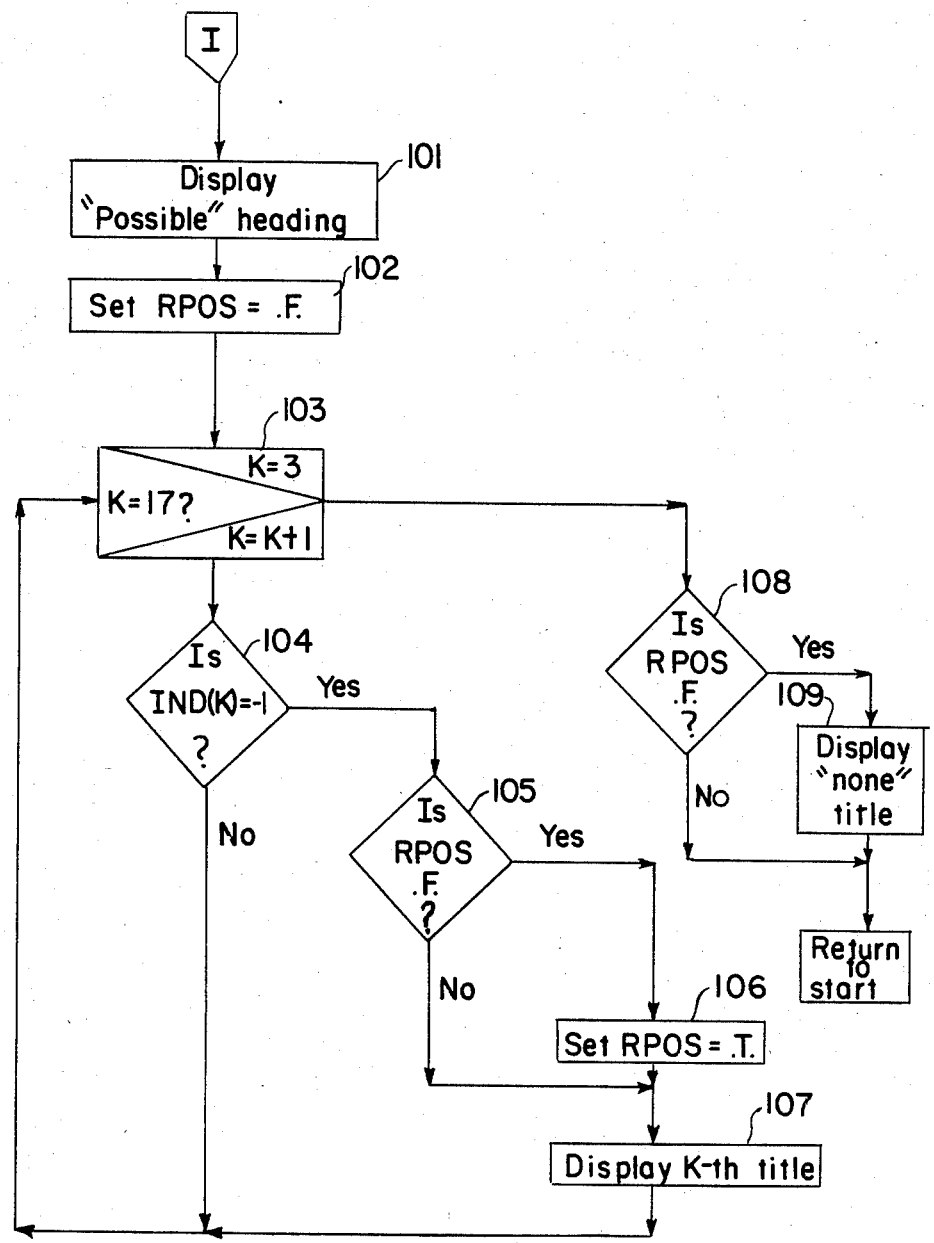

The routine then follows the tag I to FIG. 14b where the sub-heading "POSSIBLE CONDITIONS" is generated in block 101 and a logic variable RPOS is set equal to false in block 102 to zero out prior indications of possible conditions. A loop is then entered at block 103 where each of the off-normal condition status indicators is checked in block 104 to determine if the condition has been identified as possible. If so, RPOS is made equal to true by blocks 105 and 106 and the title of the condition is displayed by block 107. When no "possible" conditions exist as determined in block 108, "NONE" is displayed under the "POSSIBLE CONDITIONS" sub-title by block 109. The other displays such as those illustrated in FIGS. 6 and 7 are generated in a similar manner the details of which will be understood by those skilled in the art.

In accordance with another aspect of the invention, the status tree concept is applied to meet the requirements of the Safety Parameter Display System (SPDS) which the Nuclear Regulatory Commission has required for installation in the control rooms of operating nuclear power plants. The intent in providing an SPDS in the control room is to make available to the plant operators an indication of the status of the plant in terms of a set of "Critical Safety Functions". To the extent that the Critical Safety Functions are satisfied by a combination of automatic and manual actions during and after an accident or other abnormal occurrence that results in shutdown of the reactor, the safety of the general public against releases of radioactive materials can be assured. Failure to satisfy one or more of the Critical Safety Functions significantly increases the likelihood of exposure of members of the general public to released radioactivity during the course of the event. Thus, monitoring the status if a nuclear power plant in terms of the Critical Safety Functions is equivalent to monitoring the potential for endangering the general public during an abnormal event.

The purpose of the proposed display is to convey to the operator in as simple and unequivocal terms as possible the status of the Critical Safety Functions. The functions monitored are selected on the basis of their relevance to the several barriers in the plant to the release of radioactivity. The particular critical functions selected are:
1. Subcriticality
2. Core Cooling
3. Reactor Coolant System Integrity
4. Heat Sink
5. Containment
6. Reactor Coolant Inventory In one form, this aspect of the invention is embodied in color CRT displays which present a visual representation of the entire status tree for each of the selected critical safety functions and identifies the path through each tree representative of the current status of that function. Preferably, the selected critical safety function status trees are sequentially presented on a single CRT although a separate display device could be provided for each.

Figure 15:
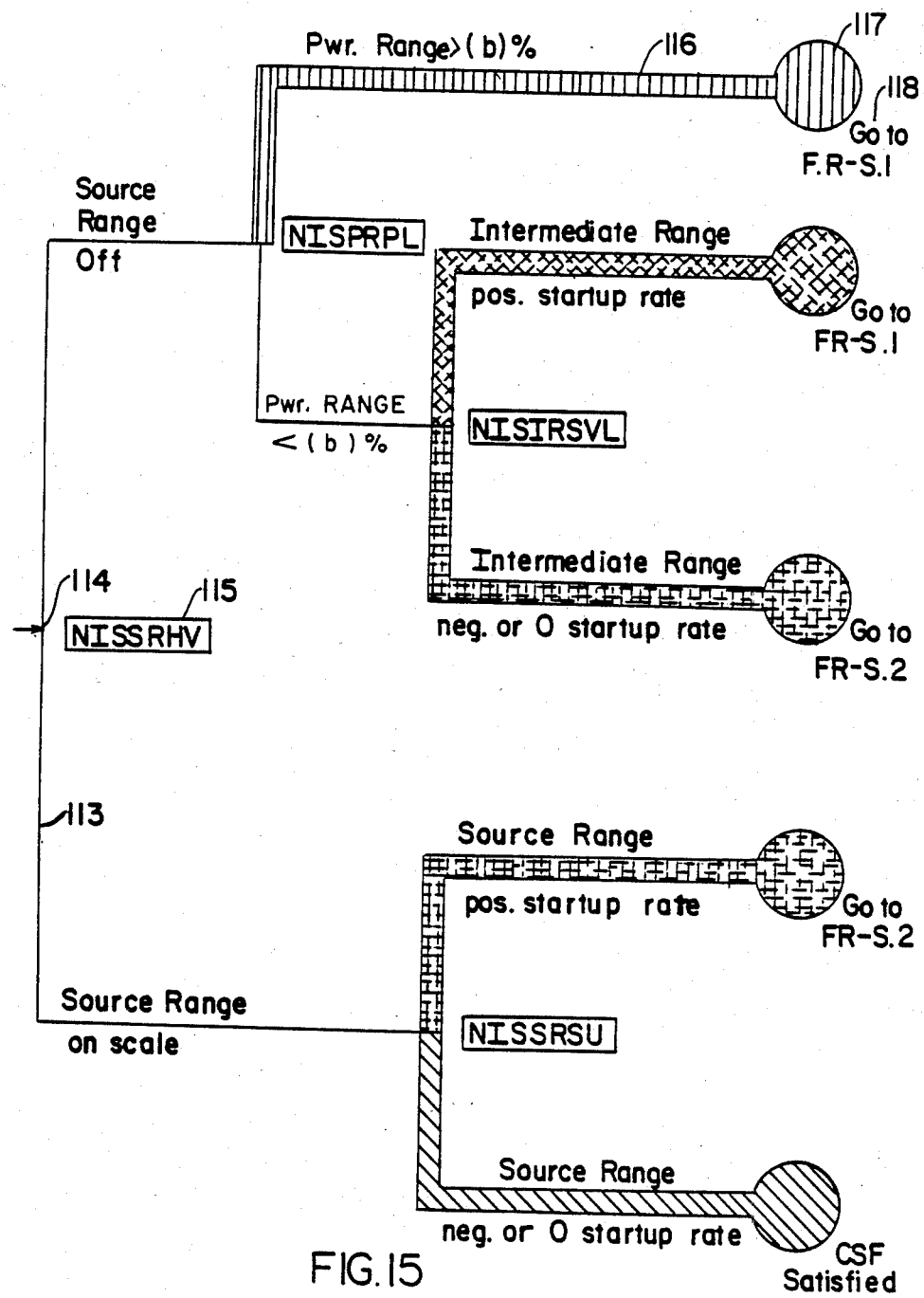

An example of the configuration of a Subcriticality status tree is illustrated in FIG. 15. This tree provides an indication of whether the reactor actually shutdown when it was tripped. The tree is defined by a pattern of lines 113 which branch out to indicated preselected ranges for each parameter considered. At each branch point 114, a read out 115 of the current (measured or calculated) value of the associated parameter is provided. While in FIG. 15 the associated mnemonic set forth in Table B above appears in the read out 115 for identification purposes, in practice the appropriate numeric or logic indication is presented. The branches which emanate from the branch points represent the range in which the current value of the parameter falls compared to a selected setpoint. If the current value is above the setpoint, the upper branch is taken; if below; the lower branch is selected. For reference, the relationship of the current value relative to the setpoint value is verbally indicated on each branch. An indication of the branch selected can be made in several ways. In the presently preferred approach, the selected branches of the tree are caused to flash while the unselected branches remain steady. The selected branches could alternatively be identified by color. In the preferred embodiment, color is used in the display for a different purpose. The terminal branches 116 are color coded, with the assigned color indicating the level of hazard represented by the indicated critical safety function status. The colors are assigned as follows:
Red = existing hazardous condition
Orange = potentially dangerous condition
Yellow = off-normal condition
Green = normal condition The terminal branches are always presented in their assigned color. The particular terminal branch which is part of the path representing current status is flashed like the preceeding selected branches which lead to it.

Preferably, an indication is provided, adjacent each terminal branch 116, of the status of the critical safety function represented by the path through the tree that ends with that branch. Such a status indication can take the form, for instance, of a circle 117 color coded as indicated above to instantly convey to the operator the seriousness of the situation. Where the terminal branch is also color coded as in FIG. 15, the status indicator 117 can be integrally connected to the branch. Adjacent each status indicator 117 are indicia 118 of a Function Restoration Procedure associated with that particular condition. These procedures are check lists which the operator is to follow in order to restore the critical safety function. In the example of FIG. 15, they are in the form for instance of "Go to FR-S.1" which means go to the first list associated with the Subcriticality tree. If the system is arranged for automatic control, signals would be generated for the automatic control system to carry out these procedures.

With regard to the specifics of the Subcriticality status tree of FIG. 15, the pertinent parameters for this tree are the reactor power level measurements. As mentioned previously, the reactor power level which is measured by monitoring the flux of neutrons escaping from the reactor core extends over such a wide range of values from shutdown to 100% power that three separate instrumentation systems are used. The source range instrumentation which is used at the lowest power level is very sensitive and hence its high voltage source is turned off when the power begins to rise to prevent damage to the instrumentation. Thus in FIG. 15, the source range high voltage is checked at the first branch point. If it is off indicating a power level above shutdown power the upper branch is selected. Next the power range power level NISPRPL instrumentation reading is compared with a setpoint value b% and if it exceeds this reference level, indicating that the reactor did not shutdown, the upper terminal branch is selected. This branch and the associated status indicator are colored red indicating that a hazardous condition exists and they will flash as will the branches leading to them to indicate the current status of the Subcriticality function.

If the NISPRPL signal is below b%, the intermediate range signal NISIRSU is compared with a positive start-up rate setpoint signal. If the rate of increase of power level is above this start-up rate the upper terminal branch is selected. This terminal branch and the associated status indicator are colored orange to indicate that a potentially dangerous condition exists. On the other hand if NISIRSU indicates a negative or zero start-up rate, the lower yellow terminal branch and status indicator are selected indicating an off-normal condition. If the initial comparison in the Subcriticality status tree indicates that the source range is on scale so that the lower branch is selected, that source range reading NISSRSU is compared with a start-up rate setpoint level. If that level is exceeded, the upper, yellow branch and indicator are selected. If it is not, the lower green terminal branch and status indicator are selected. In the latter case, the critical safety function is satisfied as indicated by the associated indicia and no function restoration procedure is required.

Figure 16:
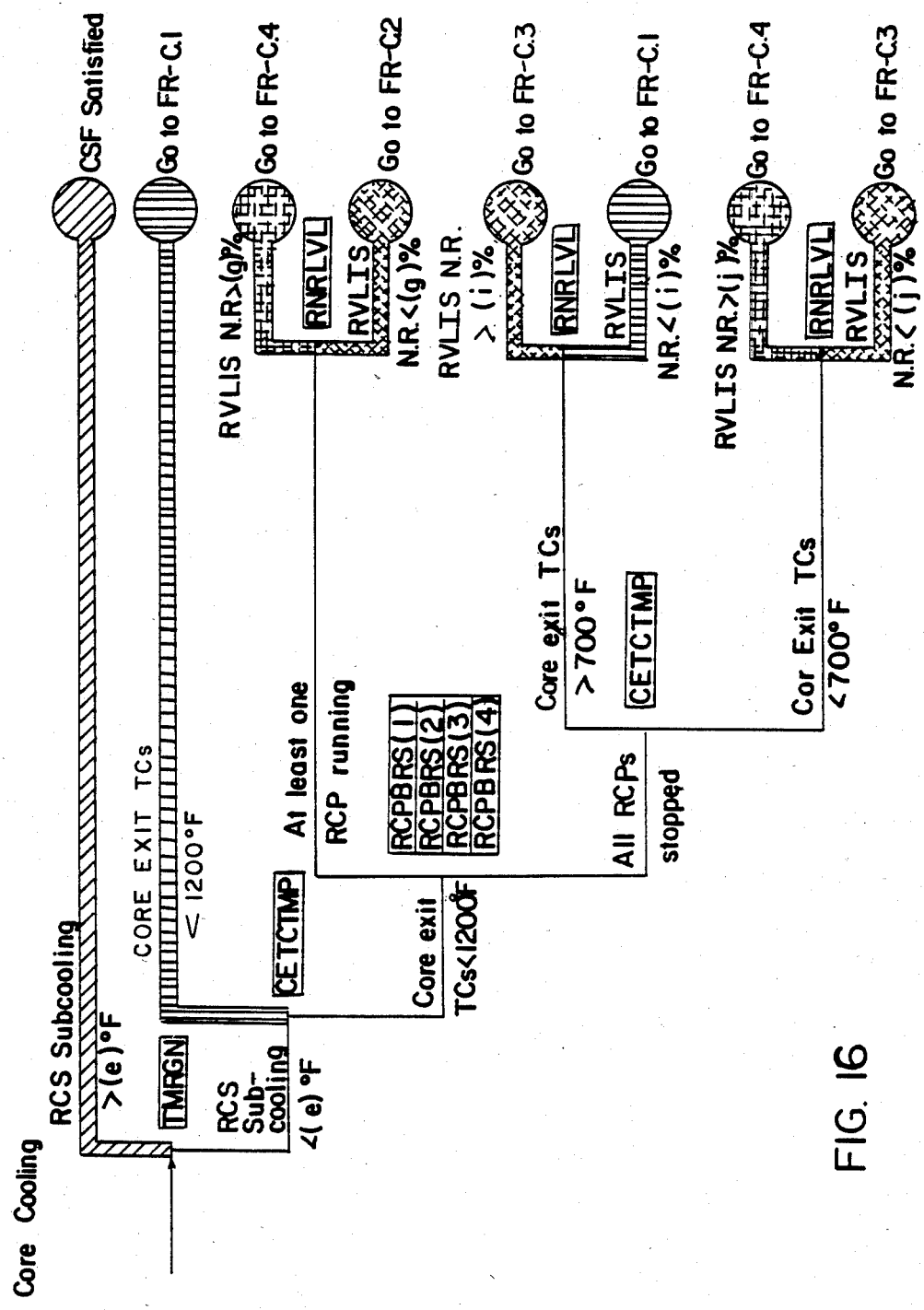

The Core Cooling critical safety function status tree display is illustrated in FIG. 16. The purpose of this tree is to determine if the reactor core is being adequately cooled. The first parameter considered is the subcooling temperature margin TMRGN which, as mentioned in connection with the first embodiment of the invention described above, is a calculated parameter which is a measure of the number of degrees farhenheit that the temperature of the core, as measured by the core exit thermocouples, is below its boiling point for the existing pressure as measured at the pressurizer. If this margin is greater than the setpoint value e° F. the upper, green terminal branch is selected indicating a normal condition. If the margin is less than e, the core exit thermocouple temperature CETCTMP is checked and if it exceeds 1200° F., the upper, red terminal path is selected indicating the existence of a hazardous condition. If CETCTMP is below 1200° a check is made to see if any one of the four reactor coolant pumps is running as indicated by the status of the pump breakers RCPBRS(N). If at least one pump is running, indicating that there is forced circulation of the reactor coolant, the reactor vessel coolant level RVNRLVL is compared with a setpoint value g and the upper, yellow terminal branch is selected if it exceeds g, otherwise the lower, orange terminal branch completes the path through the tree. If none of the reactor coolant pumps are running, and the core exit thermocouple temperature is above 700° F., the reactor vessel coolant level is compared to another setpoint value i, with the upper, orange terminal branch being selected when the measured level exceeds i and the red, lower terminal branch being selected otherwise. In a similar manner, when the core exit temperature is below 700° F., the terminal branch is selected on the basis of whether RVNRLVL is greater or less than yet another setpoint value j.

Figure 17:
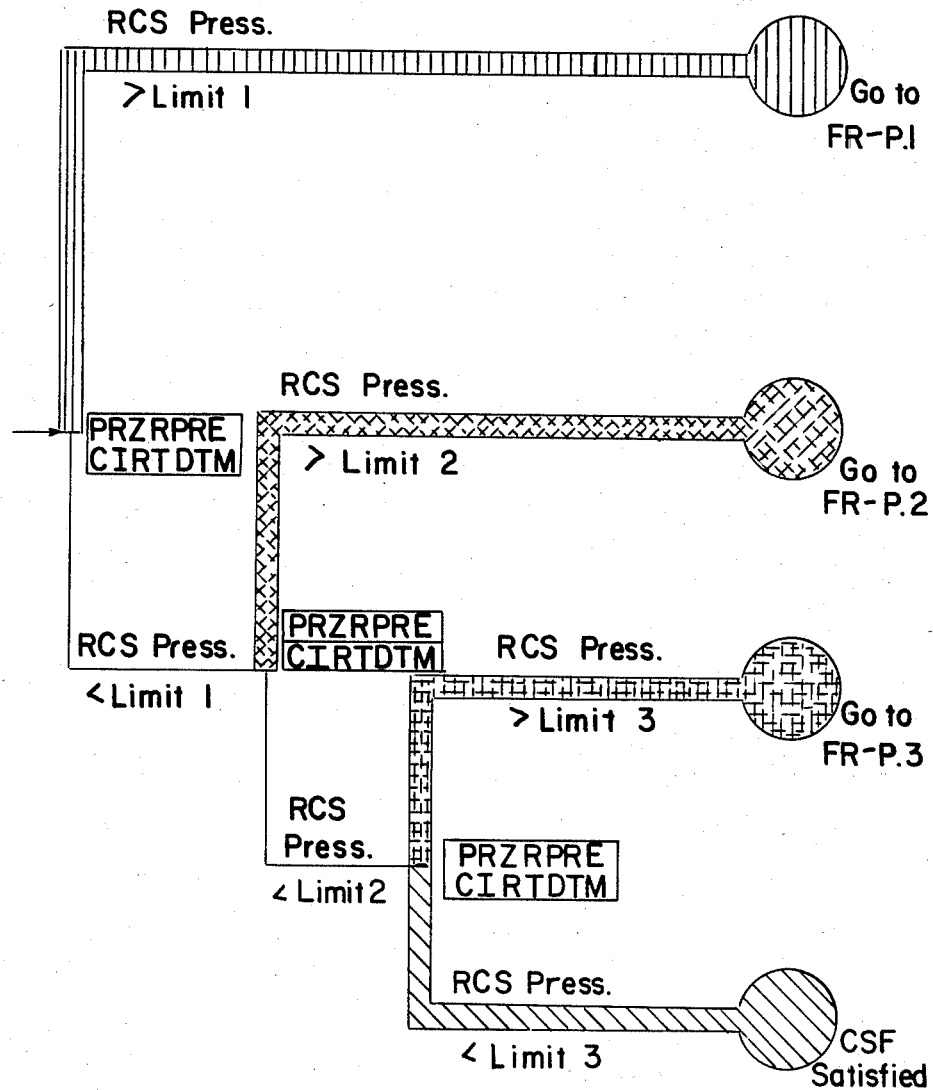

The Reactor Coolant System Integrity status tree shown in FIG. 17 determines whether the pressure in the reactor coolant system as measured at the pressurizer is within specified limits based upon coolant temperature. Limit 1 is the metal fracture limit of the coolant system. Limit 2 is a precautionary limit which signals an approach to Limit 1. Limit 3 is the heat up and cool down limit specified in the Plant Technical Specifications which sets the acceptable limits during system transients. Each of the limits is stored in computer memory as a function of pressurizer pressure PRZRPRE and core inlet resistance temperature detector temperature CIRTDTM. At each branch point, the measured values of pressurizer pressure and core inlet temperature are successively compared with the limit functions to determine the branch to be selected. Basically, if Limit 1 is exceeded, a hazardous, red, condition exists, if the pressure-temperature combination is less than Limit 1 but, exceeds Limit 2, a potentially hazardous, orange, condition exists, while a resultant below Limit 2 but above Limit 3 signals an off-normal yellow condition. Only if the none of the limits are exceeded does a normal, green, condition exist.

Figure 18:
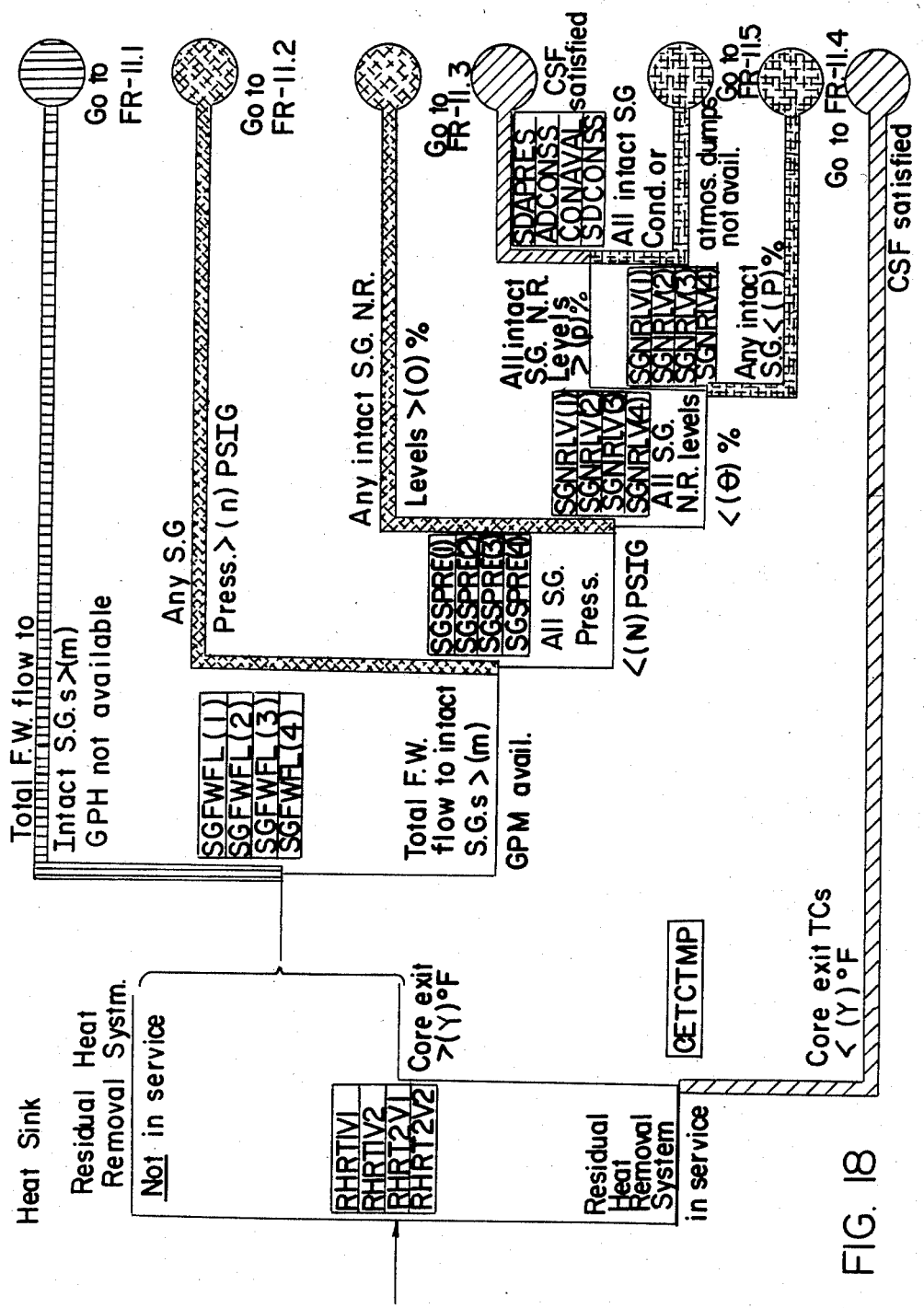

FIG. 18 illustrates the status tree display for the Heat Sink critical safety function. This status tree is related to the capacity of the residual heat removal system, and in the region where they are effective, the steam generators including their dump systems, to absorb the heat generated by the reactor. Initially, the status of the first and second valves for each of the residual heat removal systems is checked to see if either system is in service. If at least one is in service, and the core exit thermocouple temperature, CETCTMP, is below a setpoint value, y, the heat sink critical safety function is satisfied as indicated by flashing of the bottom, green terminal branch of the status tree. If the core exit temperature is above y, or neither residual heat removal system is in service, a determination is made as to whether the sum of the feedwater flows SGFWFL(N) of the intact steam generators is above or below a minimum setpoint value m. A steam generator is considered intact, as explained more fully below, if the water level SGNRLV(N) is below a setpoint value and the pressure SGSPRE(N) is above a setpoint value. If the total feedwater flow to intact steam generators is not above the minimum value, the topmost, red terminal branch is selected indicating that a hazardous condition exists.

If the total feedwater flow to intact steam generators is adequate, the individual steam generator pressures are compared to a setpoint value n. If any steam generator pressure exceeds n, the second from the top, orange terminal branch is selected otherwise, steam generator levels SGNRLV(N) are compared to setpoint value $\sigma$. If any intact steam generator level exceeds $\sigma$, the upper, orange terminal branch is selected. If all the intact steam generator levels are below $\sigma$, they are then compared with a second setpoint value p. If the level of any intact steam generator is below the level p, the second from the bottom, yellow teaminal branch is selected. On the other hand, when all intact steam generator levels are above p, a determination is made whether they all have either the condenser dump or their own atmospheric dump available. This is done by checking the steam dump header air pressure SDAPRES which supplies the motive force for operating the dump values, the atmospheric dump control selector status ADCONSS to determine if it is in automatic, the condenser available status CONAVAL, and the steam dump selector switch status SDCONSS which controls the condenser dump valve to determine if it is positioned to dump on steam pressure.

The containment critical safety function status tree shown in FIG. 19 provides an evaluation of the danger of a radiation leakage from the containment 3 surrounding the reactor vessel 2. If the containment pressure, CONTPRE, exceeds a setpoint value r, a hazardous condition exists and the top, red terminal branch is flashed. If the containment pressure is below r but above a second setpoint value, s, a potentially hazardous condition exists and the second, orange terminal branch is selected. When the pressure is below both r and s, the sump level, CONTSUL, is compared to a setpoint value t which if exceeded will cause the third orange terminal path to flash. If the sump level is below t and the radiation level is below its setpoint value, u, conditions are normal, and the bottom, green terminal branch is selected. However, when the radiation level exceeds the setpoint value, the yellow terminal branch is flashed signaling the off-normal condition.

Figure 20:
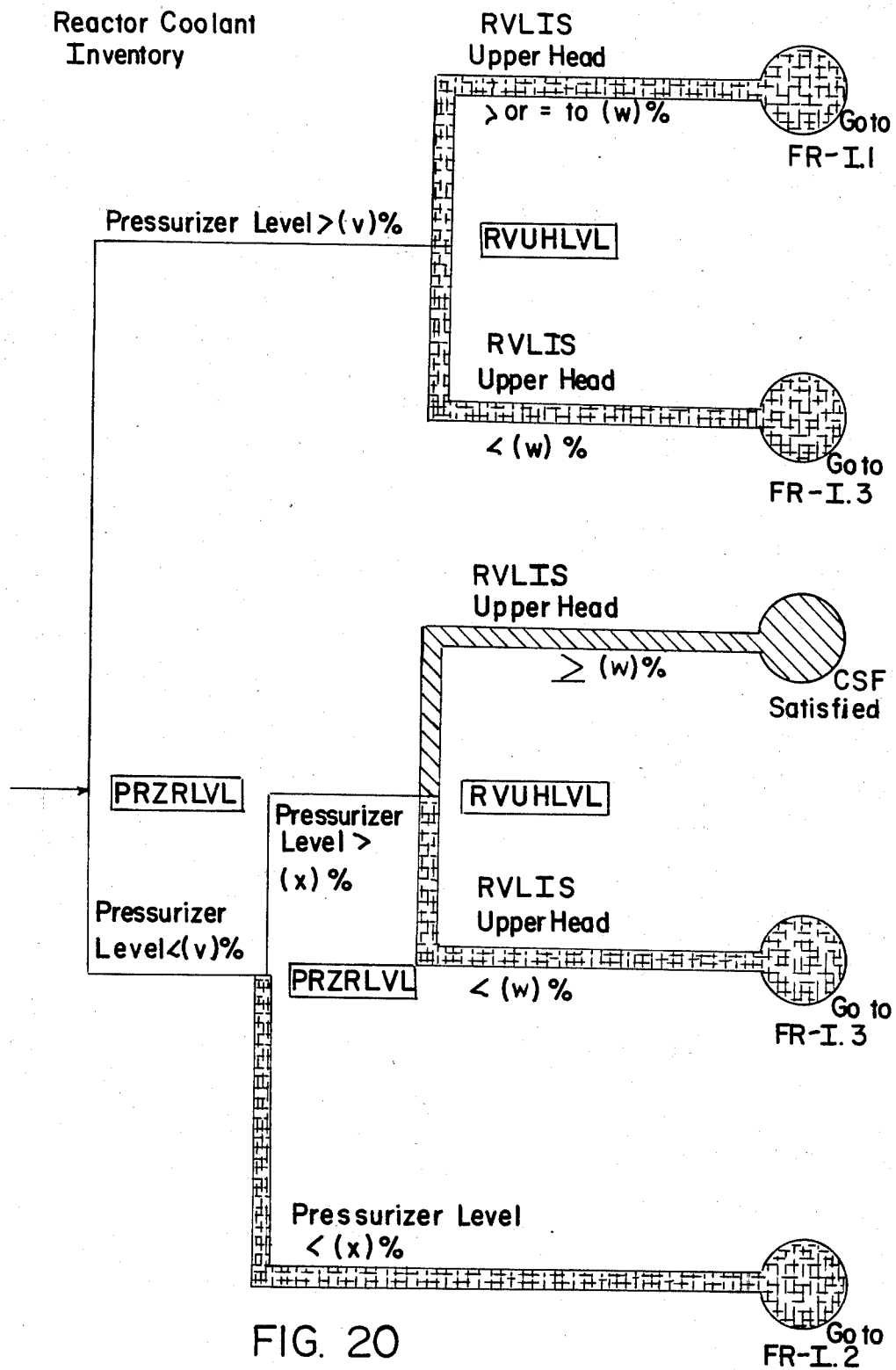
Figure 22:
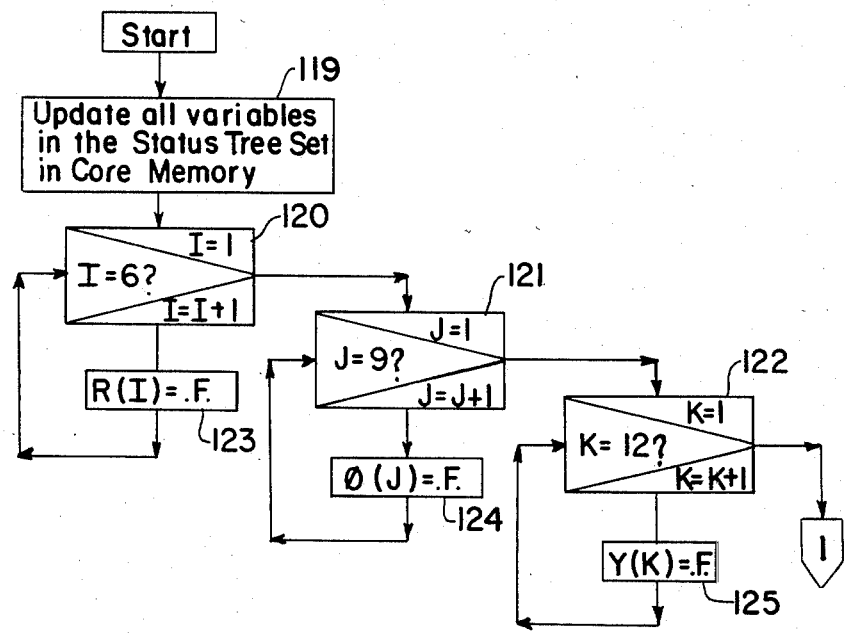
FIGS. 22 through 28 are flow charts suitable for generating the status tree displays of FIGS. 15 through 20.
Figure 23:
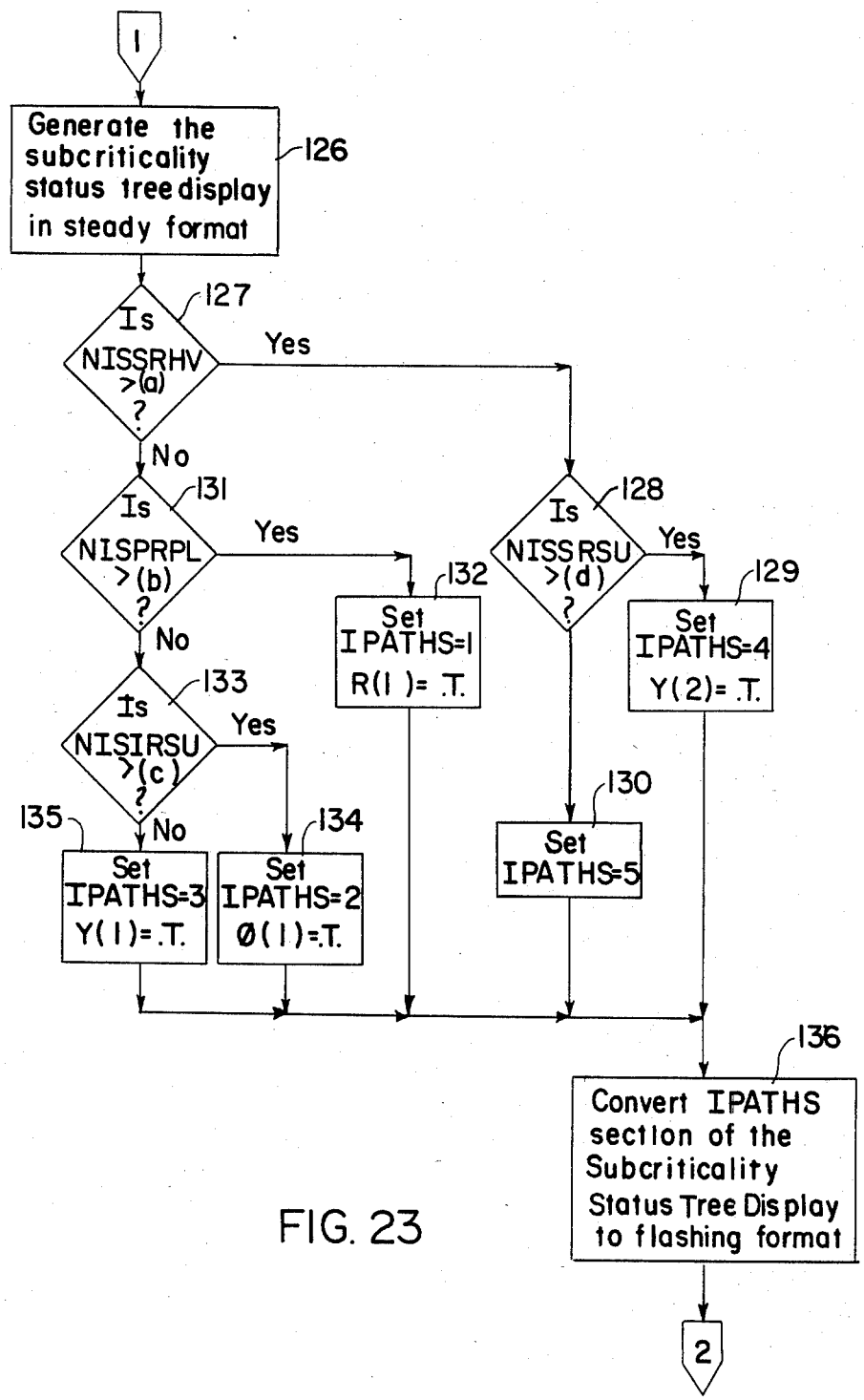

The last critical safety function status tree is the Reactor Coolant Inventory tree illustrated in FIG. 20. This tree, by monitoring the coolant levels in the pressurizer and the reactor vessel upper head, provides information useful in determining if the quantity of water present in the primary system is satisfactory and/or if a bubble has formed in the reactor vessel head. Under most conditions, water is constantly being added to and withdrawn from the primary system in conjunction with the boron control system. Should these additions and withdrawals get out of balance, the amount of water in the primary system could become either too much or too little. In addition, leaks in the system could cause the water present to fall below acceptable standards. Another condition which is monitored is the formation of a bubble in the reactor vessel head which could lead to uncovering the reactor core and possibly insufficient cooling.

Thus the reactor coolant inventory tree first compares the pressurizer coolant level PRZRLVL to a high setpoint v. If this level is exceeded and the reactor vessel upper head level exceeds a setpoint value, w, there is too much water in the primary system and the upper, yellow terminal branch is flashed. However, if the reactor vessel upper head level is below the value w, with the pressurizer level high, this is an indication that a steam bubble has formed in the upper head and the second, also yellow, terminal branch is selected.

When the pressurizer level is below the high value, w, and is also below a minimum setpoint value, x, there is insufficient water in the primary system and the bottom, yellow terminal branch is flashed. If the pressurizer level is above, x, indicating that it is in the satisfactory range, and the reactor vessel upper head level RVUHLVL is also above the setpoint value w, normal conditions exist and the green terminal branch is flashed. If on the other hand, the reactor vessel upper head level is low while the pressurizer level appears normal, this is an indication that a bubble has formed in the upper head and that the water inventory is low since normally the bubble in the reactor vessel upper head would cause the pressurizer level to be high. Under these circumstances the second from the bottom, yellow terminal branch is flashed.

All of status tree displays of FIGS. 16 through 20 include, as was described in connection with the Subcriticality tree of FIG. 15, indicia adjacent each terminal branch directing the operator to a particular set of procedures designed to mitigate the effects of the indicated abnormal condition. The situation could exist of course where more than one abnormal condition is indicated at one time. While the color coding provides guidance as to the degree of hazard associated with each abnormal condition and therefore indicates which conditions should be addressed first, it is possible that more than one condition of the same color code could be present simultaneously. Under these circumstances, it is important to set priorities so that action can be initiated to minimize or eliminate the most critical hazards first. It is all important that the operator be presented with a clear indication of the priority of the suggested procedures in order that he may react rapidly and effectively epecially in situations of high stress.

Accordingly, each terminal branch is characterized by a parameter in the form IPATHn, where n is a letter identifying the specific tree. All of the red, orange and yellow terminal branches are also characterized by a parameter R(i), O(j) or Y(k) indicating the priority within each color code. As discussed already, each branch is associated with a Function Restoration procedure in the form FR-n.m where n again refers to the particular status tree and m is a sequence number. The n notations are associated with the status trees as follows:

S=subcriticality
C=core cooling
P=reactor coolant System Integrity
H=heat sink
Z=containment
I=reactor coolant inventory The following provides a cross-reference between the branch designations, function restoration procedures and priority parameters:

TABLE C

| "reds" | | |
|---|---|---|
| IPATHS = 1 | FR-S.1 | R(1) |
| IPATHC = 2 | FR-C.1 | R(2) |
| IPATHC = 6 | FR-C.1 | R(3) |
| IPATHP = 1 | FR-P.1 | R(4) |
| IPATHW = 1 | FR-W.1 | R(5) |
| IPATHZ = 1 | FR-Z.1 | R(6) |

TABLE C-continued

| "oranges" | | |
|---|---|---|
| IPATHS = 2 | FR-S.1 | $\phi(1)$ |
| IPATHC = 4 | FR-C.2 | $\phi(2)$ |
| IPATHC = 5 | FR-C.3 | $\phi(3)$ |
| IPATHC = 8 | FR-C.3 | $\phi(4)$ |
| IPATHP = 2 | FR-P.2 | $\phi(5)$ |
| IPATHW = 2 | FR-H.2 | $\phi(6)$ |
| IPATHH = 3 | FR-H.3 | $\phi(7)$ |
| IPATHZ = 2 | FR-Z.1 | $\phi(8)$ |
| IPATHZ = 3 | FR-Z.2 | $\phi(9)$ |
| "yellows" | | |
| IPATHS = 3 | FR-S.2 | Y(1) |
| IPATHS = 4 | FR-S.2 | Y(2) |
| IPATHC = 3 | FR-C.4 | Y(3) |
| IPATHC = 7 | FR-C.4 | Y(4) |
| IPATHP = 3 | FR-P.3 | Y(5) |
| IPATHH = 5 | FR-H.5 | Y(6) |
| IPATHH = 6 | FR-H.4 | Y(7) |
| IPATHZ = 4 | FR-Z.3 | Y(8) |
| IPATHI = 1 | FR-I.1 | Y(9) |
| IPATHI = 2 | FR-I.3 | Y(10) |
| IPATHI = 4 | FR-I.3 | Y(11) |
| IPATHI = 5 | FR-I.2 | Y(12) |

A typical CRT display with the indicated conditions within each color code listed in order of priority for execution of the applicable procedures is shown in FIG. 21. The priorities are chosen in accordance with the above table. Since the IPATHn designations would not provide instant recognition of the condition for the operator, functional verbal descriptions have been generated. For instance the condition which gave rise to the call for Functional Restoration procedure FR-c.2 is described, as indicated in FIG. 21, as MARGINAL CODE COOLING. Reference to the above table indicates that terminal branch IPATHC=4 generates this response. It should be noted that the verbal descriptions are not necessarily unique to one terminal branch since several conditions may indicate a similar functional problem. Thus, MARGINAL CORE COOLING is also used as the title for IPATHC=5 and IPATHC=8 both of which call for Functional Restoration procedure FR-c.3. Similarly, the RCS LIQUID INVENTORY LOW condition description listed in FIG. 21 under OFF-NORMAL (YELLOW) CONDITIONS is used to describe IPATHI=1, 2 and 4 as well as 5 since all of these terminal branches suggest conditions and applicable procedures related to a low liquid inventory problem. The descriptions are chosen to convey to the operator the general nature of the problem. No ambiguity is created, because the operator does not have to know the details of how the system arrived at that state, but only the general nature of the problem and, most importantly, the procedure recommended to correct the problem. If he desires more of the details of the conditions which led to the recommendation of a specific procedure, he can go back to the status tree indicated in the FR number. It will be noticed that the CRT display also indicates the recommended procedure, generated for the first time (flashing), having first priority. This priority designation is only made for the newly generated recommended procedures, it being assumed that the operator has already begun putting into effect the procedures called for on the previous run. If more than one new procedure is called for, the second one would be listed under SECOND PRIORITY (not shown) just below the first priority procedure in FIG. 21. First and Second priority designations are only given to hazardous (red) or potentially hazardous (orange) conditions. In FIG. 21, ABNORMAL CON- TAINMENT ENVIRONMENT is not given second priority since it appeared on the previous run of the program (it is in steady format).

Flow charts for a computer program suitable for generating the critical safety function status trees of FIGS. 15 through 20 and the Critical Safety Function Status Summary display of FIG. 21 are disclosed in FIGS. 22 through 31. The flow chart of FIG. 22 sets the initial conditions for the displays by updating all the variables in block 119 and through loops indicated by blocks 120, 121 and 122, setting all the red, orange and yellow condition indicators to false in blocks 123, 124 and 125 respectively. The Subcriticality tree is then produced by the flow chart of FIG. 23 where the tree format shown in FIG. 15, with the current value of each of the pertinent parameters displayed, where indicated, in digital form, is generated n block 126. If the source range high voltage signal NISSRHV, is above a setpoint value a, as tested in block 127, indicating that the source range instrumentation is on scale and therefore the reactor is at a low power level, the reading of the source range power level, NISSRSU, is compared in block 128 with a setpoint value d. If the d power level is exceeded, IPATHS is set equal to 4 and the yellow two, Y(2), indicator is set equal to true in block 129. When the power level is not above d, IPATHS is set equal to 5 in block 130. If the source range high voltage is turned off, indicating the reactor was generating more than minimal power, the power range power signal NISPRPL is compared to setpoint value b in block 131 and if the b power level is not exceeded IPATHS is set equal to 1 and R(1) is set equal to true in block 132. On the other hand, when the power range power level is below b, the intermediate range power signal, NISIRSU, is compared to setpoint value c in block 133 and IPATHS is set equal to 2 and orange one, O(1), is set equal to true in block 134 when the c level is exceeded, but IPATHS is set equal to 3 and Y(1) is set equal to true when it is not. Whatever IPATHS is set equal to, that terminal branch is caused to flash as indicated in block 136.

Figure 24:
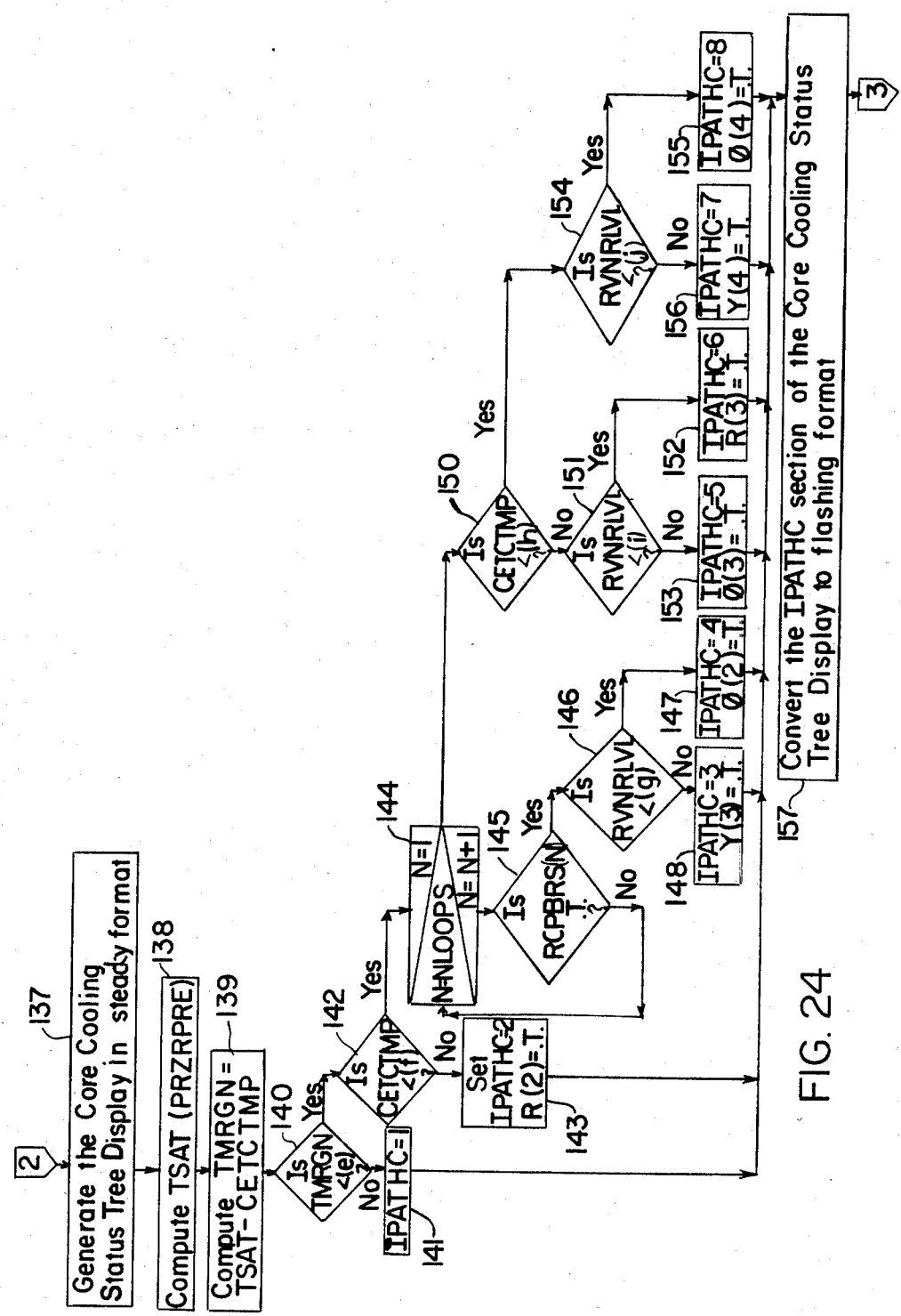

The flow chart for the Core Cooling status tree of FIG. 16 is shown in FIG. 24. As a first step, the tree format is generated in steady form in block 137. As indicated above, the temperature margin, TMRGN, a calculated parameter, is normally already available from the NSSS control system, but if not it can be generated by computing the Saturation temperature, TSAT, in block 138 in a manner well known in the art, and subtracting from that value the core exit temperature, CETCTMP, in block 139 to arrive at TMRGN. If the temperature margin is not less than a setpoint value e as determined in block 140, IPATHC, representative of the green terminal branch, is made equal to 1 in block 141. If it is, and the core exit temperature CETCTMP is equal to not less than a setpoint value f as determined in block 142, IPATHC is made equal to 2 and R(2) is made true in block 143. If the core exit temperature is less than f, a loop is entered at block 144 to determine if any reactor coolant pumps are running by checking the circuit breaker status of each pump RCPBRS(N) in block 145. If at least one pump is running the reactor vessel narrow range level, RVNRLVL, is checked in block 146 and if it is less than a setpoint value g. IPATHC is set equal to 4 and O(2) is made true in block 147, otherwise IPATHC is set to 3 and Y(3) is made true in block 148.

If none of the reactor coolant pumps are running, and the core exit temperature CETCTMP is not less than a setpoint value h, as determined in block 150, IPATHC is set equal to 6 and R(3) is made true in block 152 if the reactor vessel narrow range level exceeds a setpoint value i in block 151. If it does not, IPATHC is made equal to 5 and O(3) is made true in block 153. When CETCTMP exceeds h in block 150, IPATHC is set equal to 8 or 7 and either Y(4) or O(4) is made equal to true in blocks 155 or 156 respectively depending upon whether the reactor vessel coolant level is above or below a second setpoint value j as determined in block 154. The routine is then completed in block 157 by flashing the selected IPATHC terminal branch.

Figure 25:
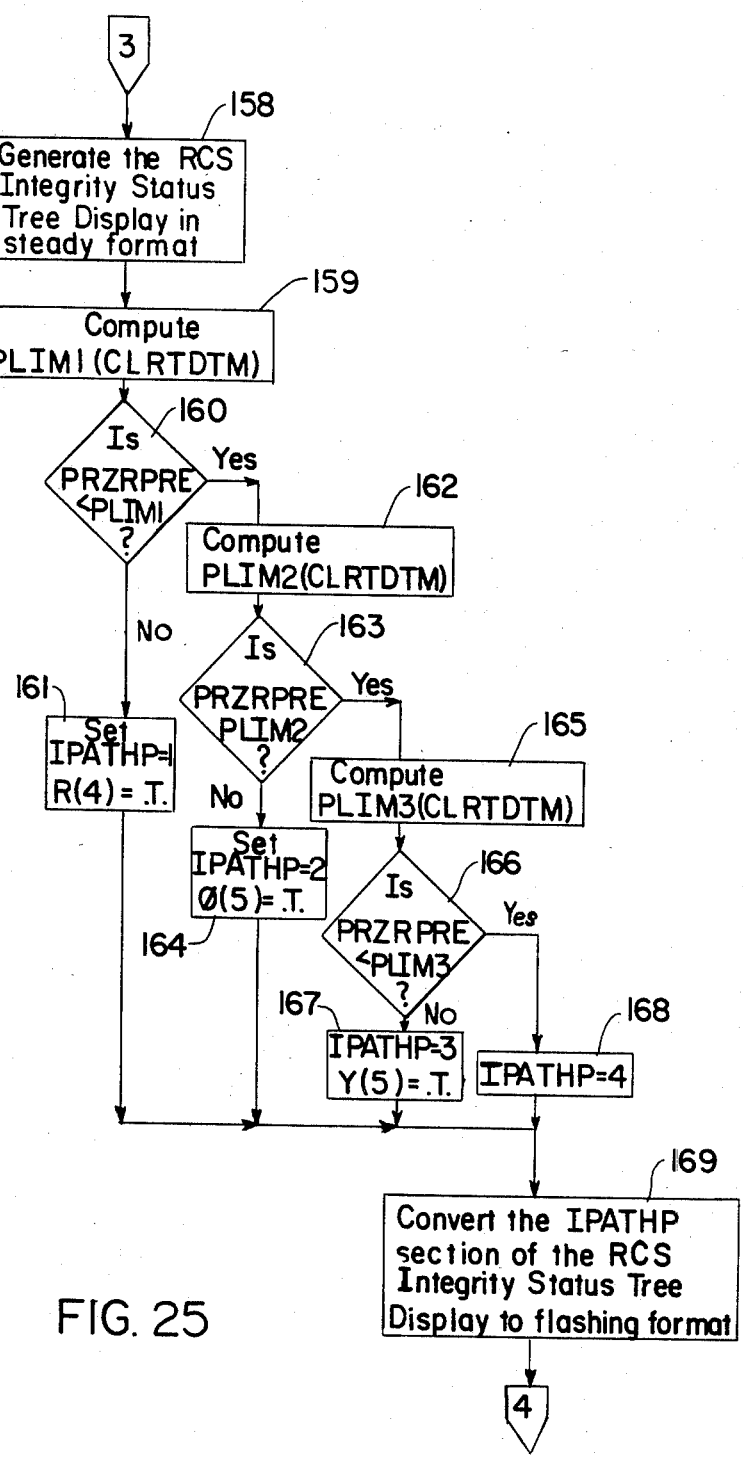
Figure 26A:
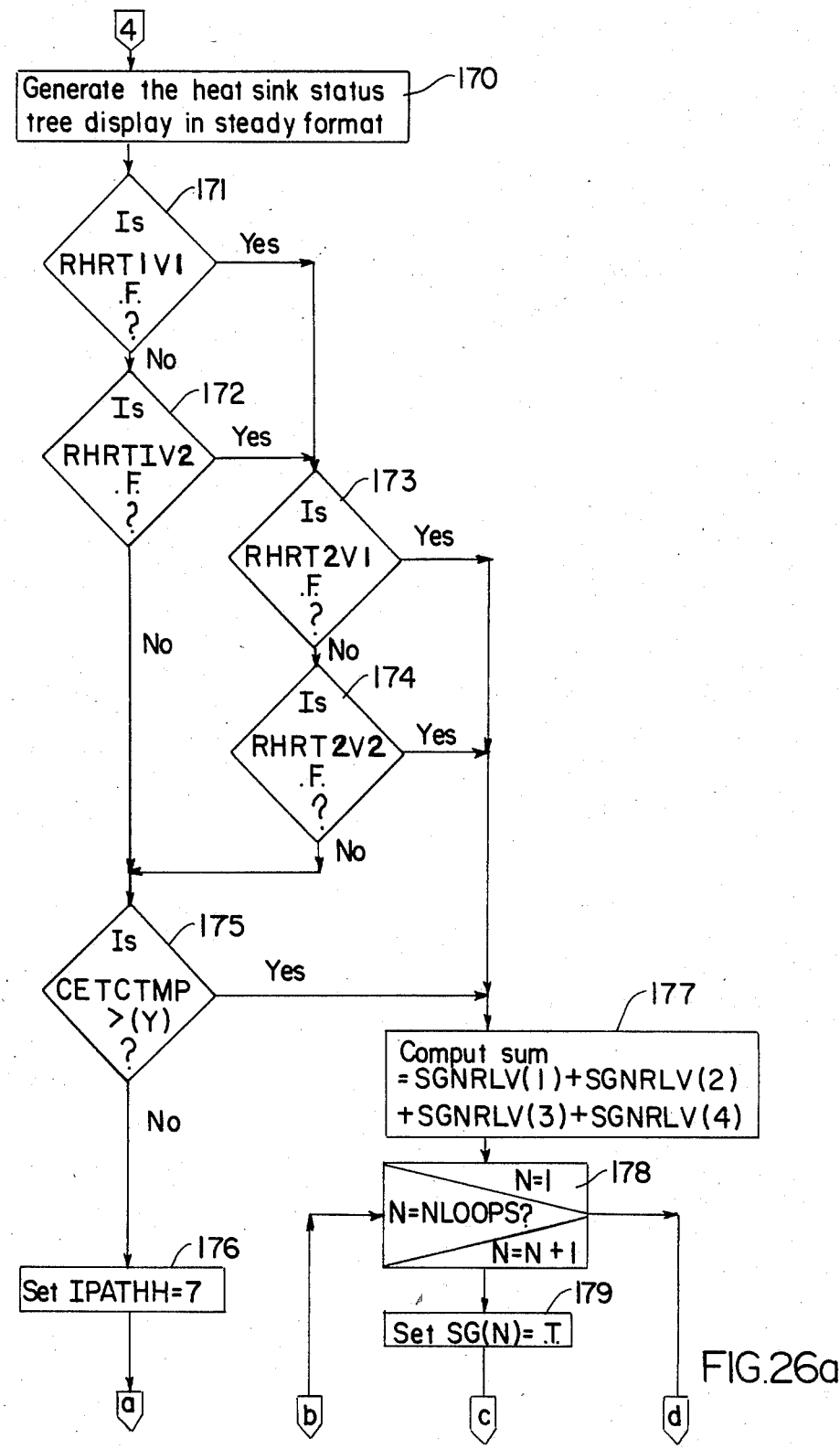
Figure 26B:
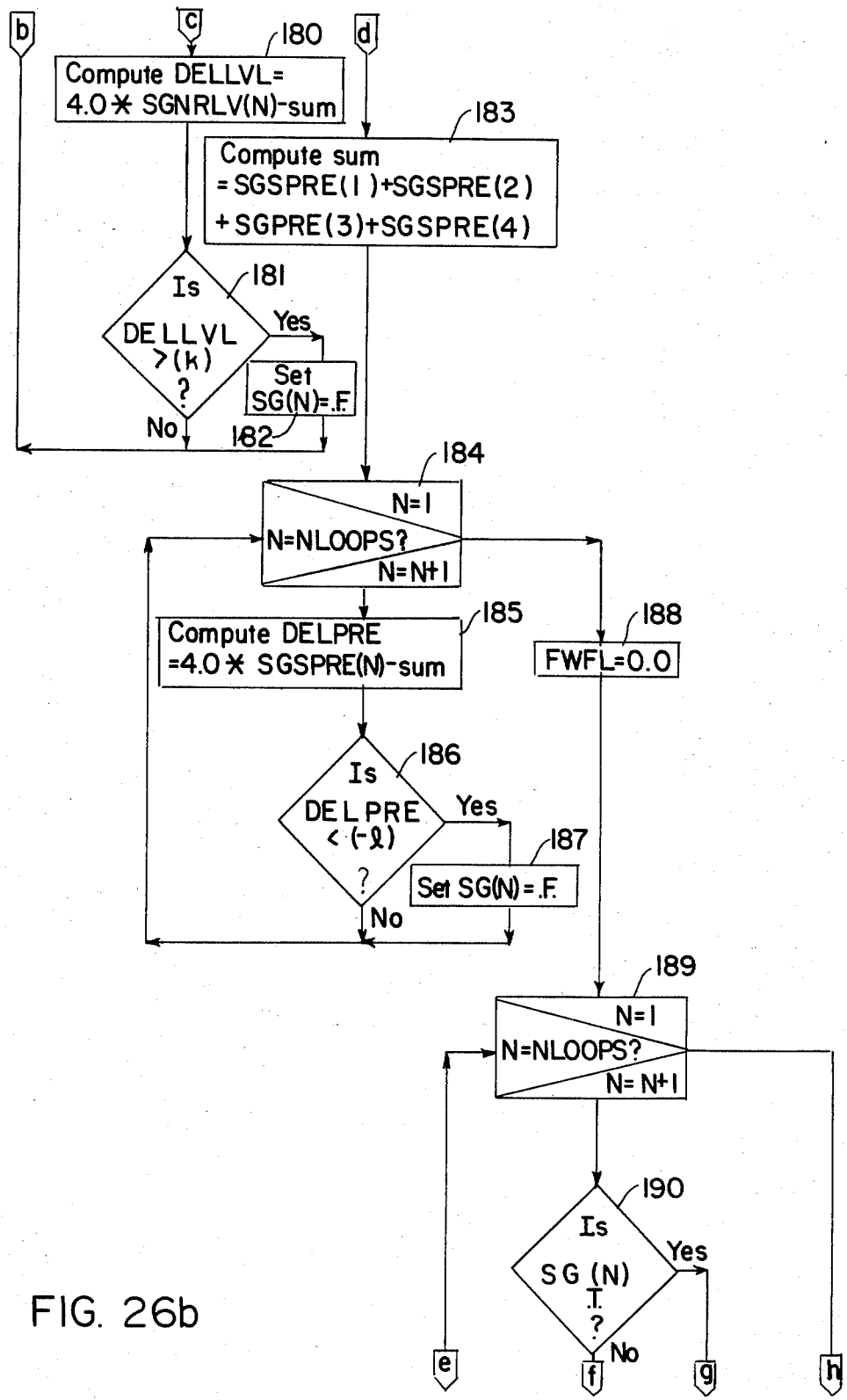
Figure 26C:
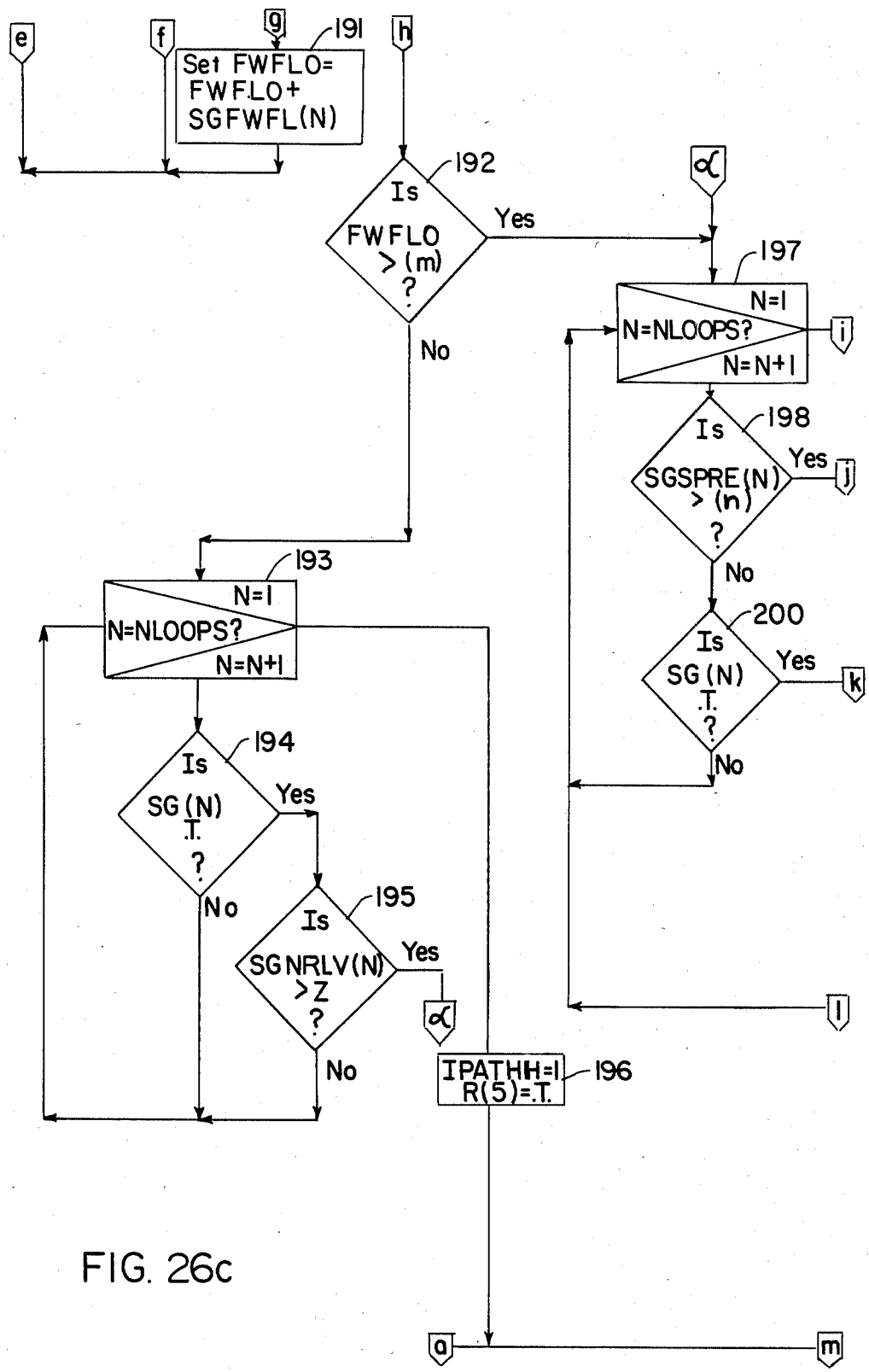
Figure 26D:
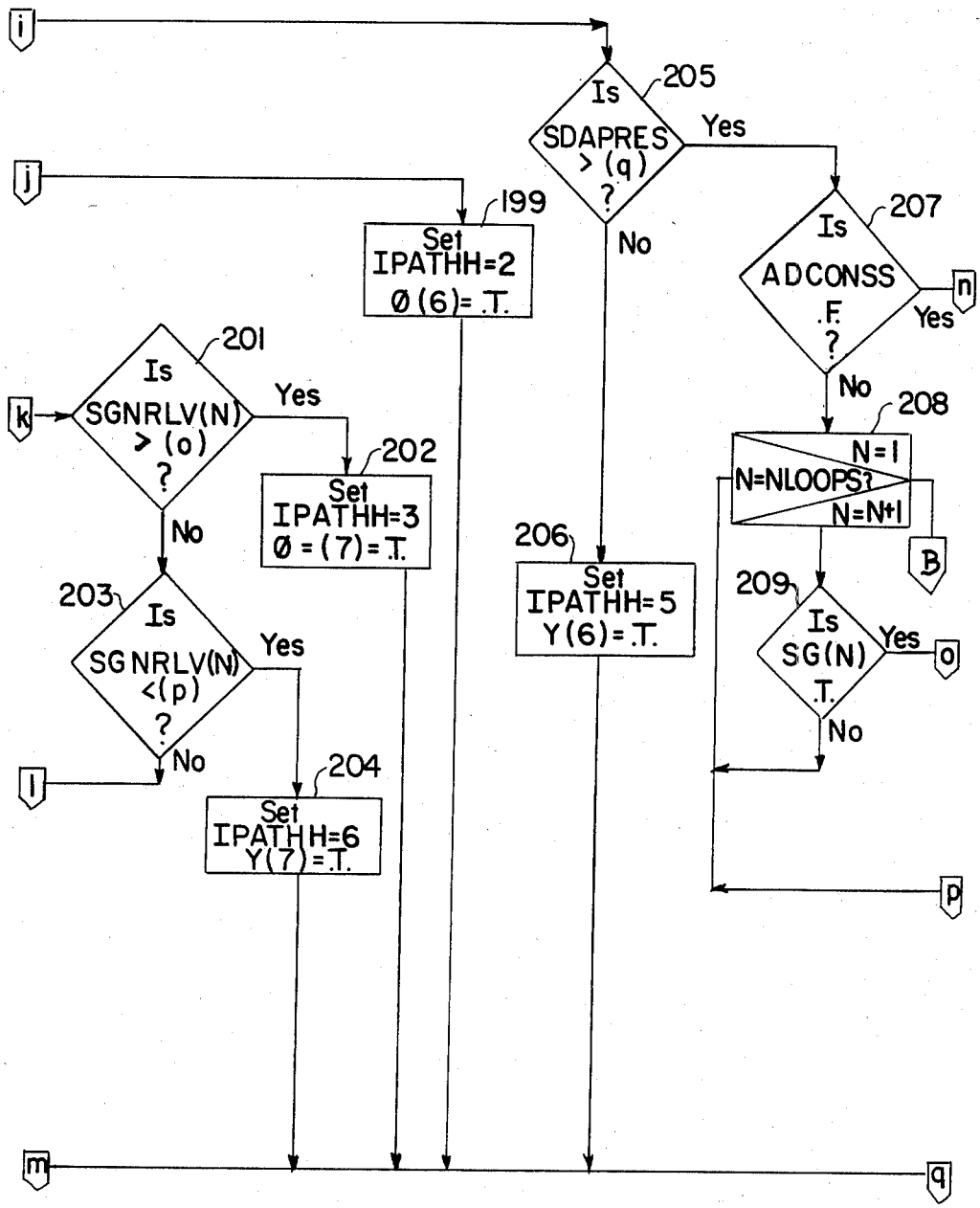
Figure 26E:
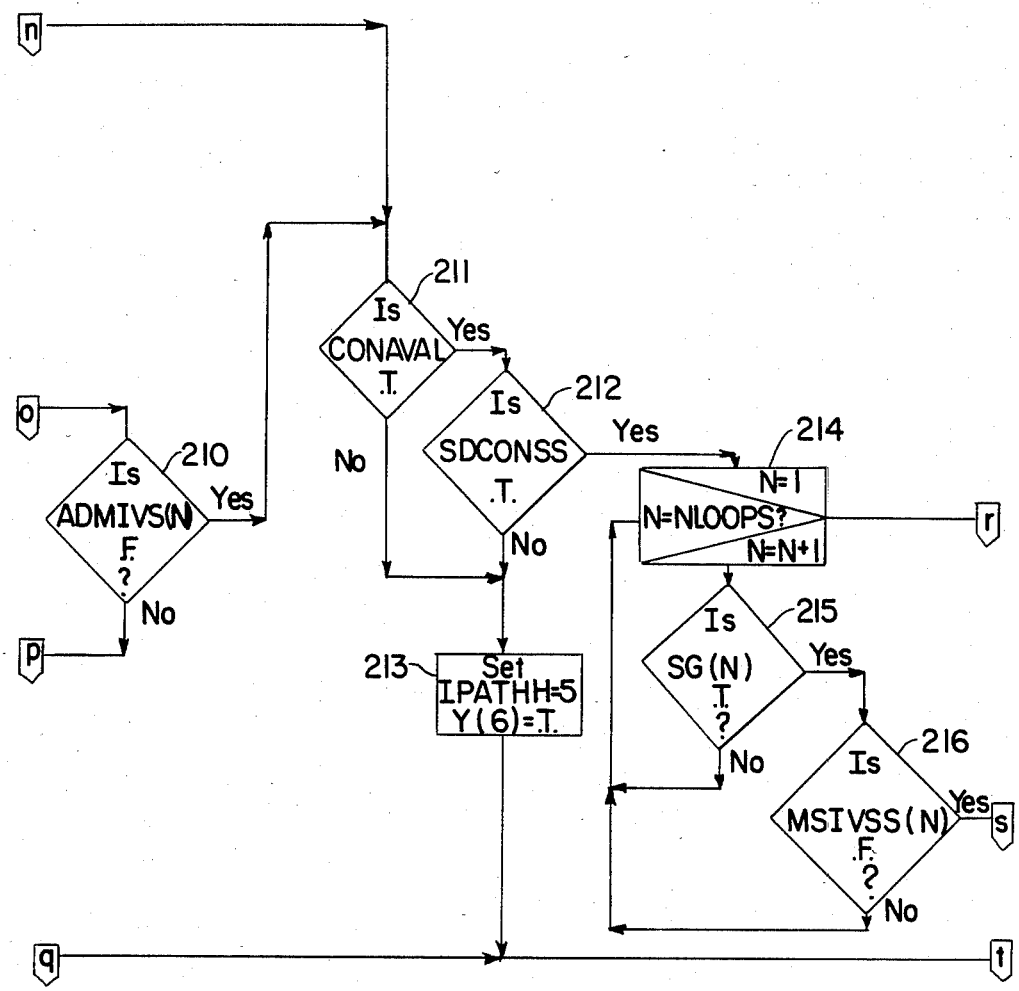
Figure 26F:
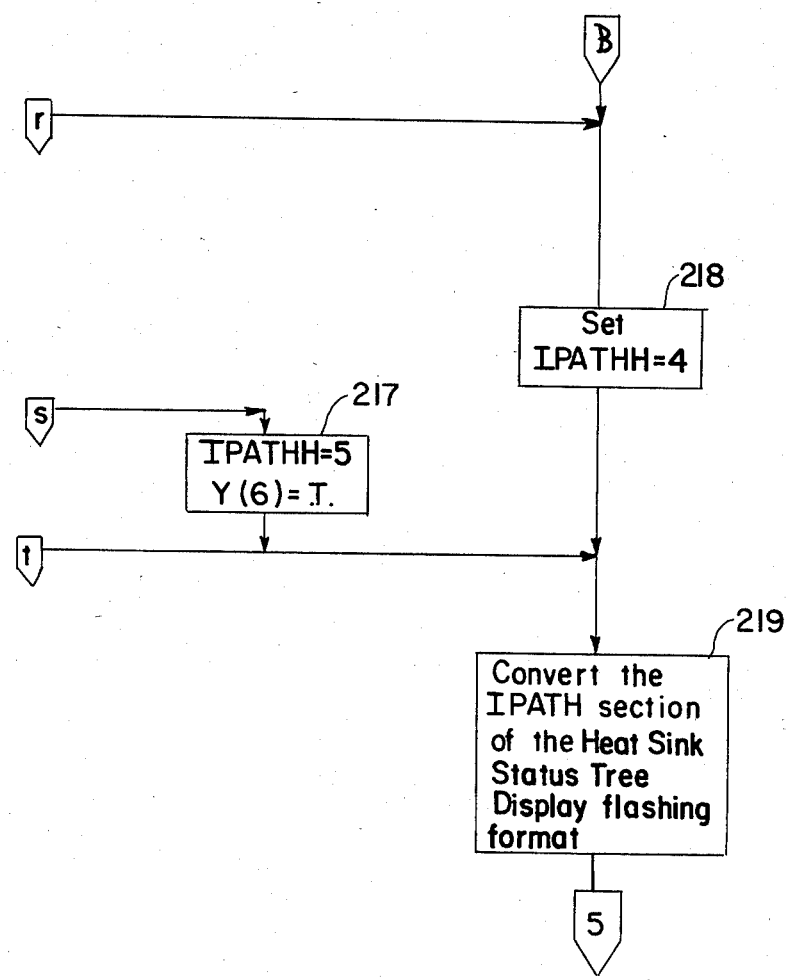

The Reactor Coolant System Integrity status tree display in FIG. 17 is generated by the flow chart of FIG. 25. Again the tree is generated in steady format in block 158. The first pressure limit PLIM1 is then calculated in block 159 using the core inlet RTD temperature, CIRTDTM, and the pressurizer pressure, PRZRPRE, is compared with this limit in block 160. If the limit is exceeded, IPATHP is set equal to 1 and R(4) is made true in block 161. If the first limit is not exceeded, the pressurizer pressure is compared in block 163 to the second limit, PLIM2, computed in block 162 and if this limit is not exceeded, IPATHP is made equal to 2 and O(5) is made true in block 164. Similarly, IPATHP is set equal to 3 or 4 in blocks 167 or 168 respectively depending upon whether the pressurizer pressure exceeds or does not exceed in block 166 the third pressure limit PLIM3 computed in block 165. In any case, the IPATHP terminal branch selected is flashed in block 169.

The flow chart of FIGS. 26a through f, produces the Heat Sink status tree display of FIG. 18, by first generating the display in steady format in block 170. Then a determination is made in blocks 171 through 174 whether the two values which control the operation of each of the two residual heat removal systems are open. If either set of valves is open, indicating that one of the systems is in service, and if the core exit temperature, CETCTMP, does not exceed the setpoint valve y, in block 175, the green terminal branch is selected by setting IPATHH equal to 7 in block 176.

If neither of the residual heat removal systems are in service or if the core exit temperature exceeds the setpoint value y, a determination is made as to which steam generators are intact. The factors considered in making this determination are whether the water level in any steam generator exceeds the average steam generator water level by more than a preselected amount, which would be an indication of a leak from the primary side into the secondary side, and whether any steam generator pressure is below the average steam generator pressure by more than a preset amount. The water level determination is accomplished by summing the water levels SGNRLV(N) in block 177 and entering a loop at block 178 in which, after setting a steam generator intact indicator, SG(N), equal to true in block 179, this sum is subtracted from four times the individual water levels in block 180 and the difference is compared to a setpoint value, k, in block 181. If the difference exceeds, k, the corresponding indicator SG(N) is switched to false in block 182. Similarly, the steam generator pressures are summed in block 183 and then in a loop, entered at block 184, the sum is subtracted from four times the individual steam pressures in block 185 and if the individual pressure is below the average pressure by more than an amount, −1, as determined in block 186, the individual intack indicator SG(N) is made equal to false in block 187.

The actual feedwater flow to the intact steam generators is determined in blocks 188 through 191 by entering a loop which adds to a feedwater flow variable, FWFLO, the flows SGFWFL(N) to the intact steam generators SG(N)=.T.. Even if the actual feedwater flow does not exceed a setpoint value, m, in block 192, it may be that sufficient flow is available but that the level in one or more of the steam generators is adequate and so there is no current flow to those units. This is determined by entering a loop at block 193 where, if the water level SGNRLV(N) in any intact steam generator, block 194, does not exceed a preset level z in block 195, IPATHH is set equal to 1 and R(5) is made true in block 196 indicating that sufficient feedwater flow is not available. If the water level in any of the intact steam generators exceeds the value, z, then sufficient flow is available despite the fact that the actual flow is below m. In this case, the routine transfer, as indicated by tag $\alpha$, to a loop at block 197 which is also entered if FWFLO exceeded m in block 192.

The loop entered at block 197 results in the setting of IPATHH equal to 2 and O(6) to true in block 199 if the steam pressure SGSPRE(N) in any steam generator exceeds a setpoint value of n as determined as the loop cycles through block 198. If the pressure in the steam generators is below n, IPATHH is set equal to 3 and O(7) is made true in block 202 if the water level, SGNRLV(N), in any intact steam generator, block 200, exceeds setpoint value $\sigma$ as determined in block 201. If the upper limit $\sigma$ is not exceeded, the levels are compared to a minimum setpoint value p in block 203, and if any level is below p, IPATHH is set equal to 6 and Y(7) is made true in block 204.

On the other hand, when the steam generator pressures are all below n, and the narrow range levels fall between $\sigma$ and p in all intact steam generators, the dump systems are checked by first determining in block 205 whether air pressure, SDAPRES, is available to operate the dump valves. If not, IPATHH is made equal to 5 and Y(6) is made true in block 206. If pressure is available in the steam dump header, the status of the atmospheric dump control selector, ADCONSS, is checked in block 207. If the selector is in automatic, the status of the atmospheric dump manual isolation valves, ADMIVS(N), of the intact steam generators, block 209, is checked in block 210 in a loop that is entered at block 208. If all of these valves are open, indicating that the atmospheric dumps on all intact steam generators are available, the routing jumps as indicated by tag $\beta$, to block 218 which sets IPATHH equal to 4.

If all of the atmospheric dumps on the intact steam generators are not available, and the condenser is not available, block 211, or it is available but the selector switch status, block 212, indicates that the selector is not set to operate on steam pressure, IPATHH is set equal to 5 and Y(6) is made true in block 213. If the condenser is available and the condenser dump is set to operate on steam pressure, the status of the main steam isolation valves, MSIVSS(N), for each intact steam generator, block 215, is checked in block 216 in a loop entered at block 214. If all of the valves are open, IPATHH is set equal to 4 in block 218, otherwise it is set equal to 5 and Y(6) is made true in block 217. The routine is completed by causing the selected IPATHH to flash in block 219.

Figure 27:
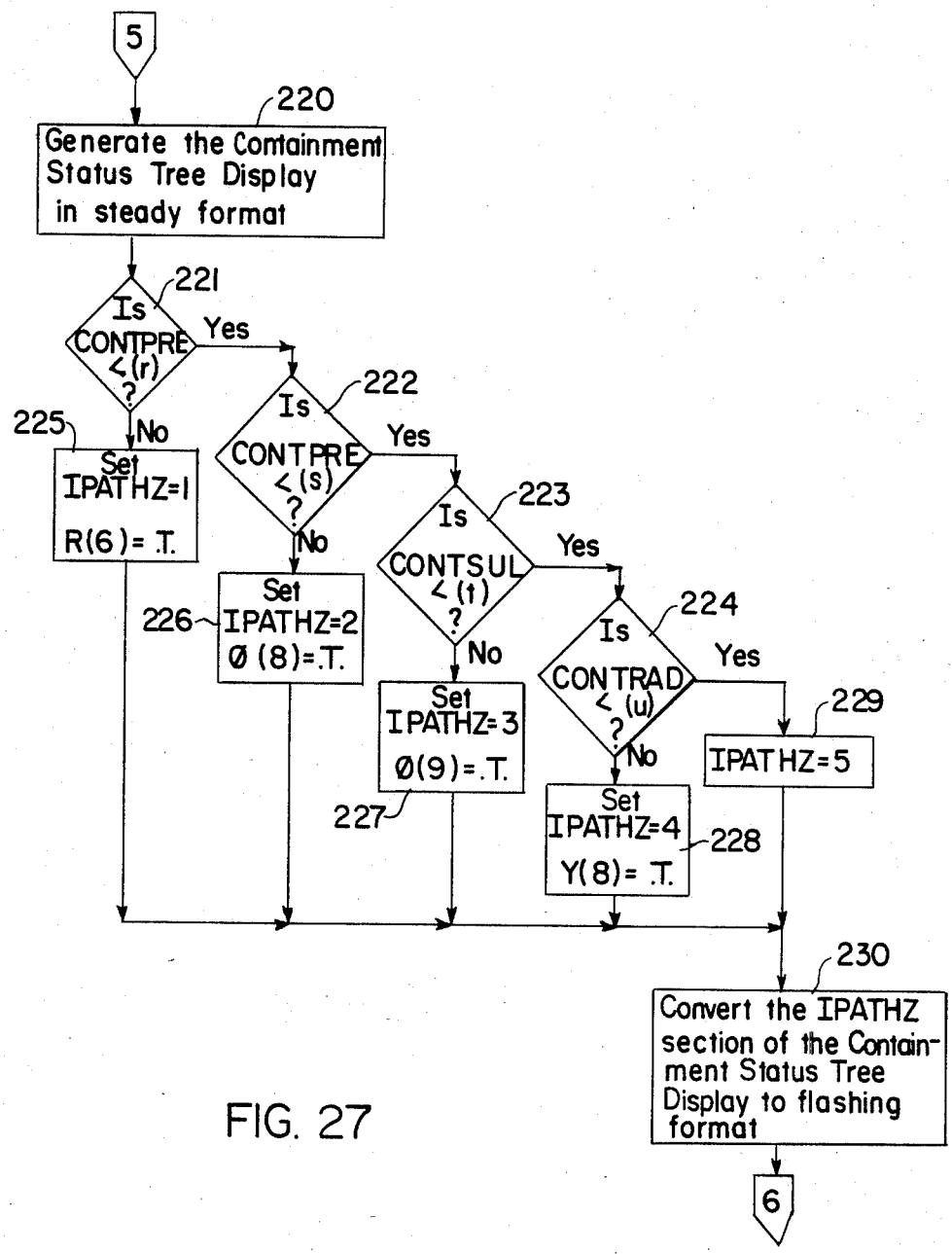

FIG. 27 illustrates the flow chart for the Containment status tree illustrated in FIG. 19. After generating the status tree display in steady format in block 220, the containment pressure, CONTPRE, is compared with setpoint value r in block 221 and, if necessary, with setpoint value s in block 222. If the containment pressure is below both of these setpoint values, the containment sump level and, if necessary, the containment radiation level are checked in blocks 223 and 224 respectively. IPATHZ is set equal to 1, 2, 3 or 4 and either R(6), O(8), O(9) or Y(8) is made true in blocks 225 through 228 if the containment pressure is more than r, if the pressure is less than r but more than s, if the pressure is less than s with the sump level more than t, or if the sump level is less than t but the radiation level is more than u respectively. If none of the setpoint values are exceeded, IPATHZ is set equal to 5 in block 229. The selected IPATHZ is caused to flash by block 230.

Figure 28:
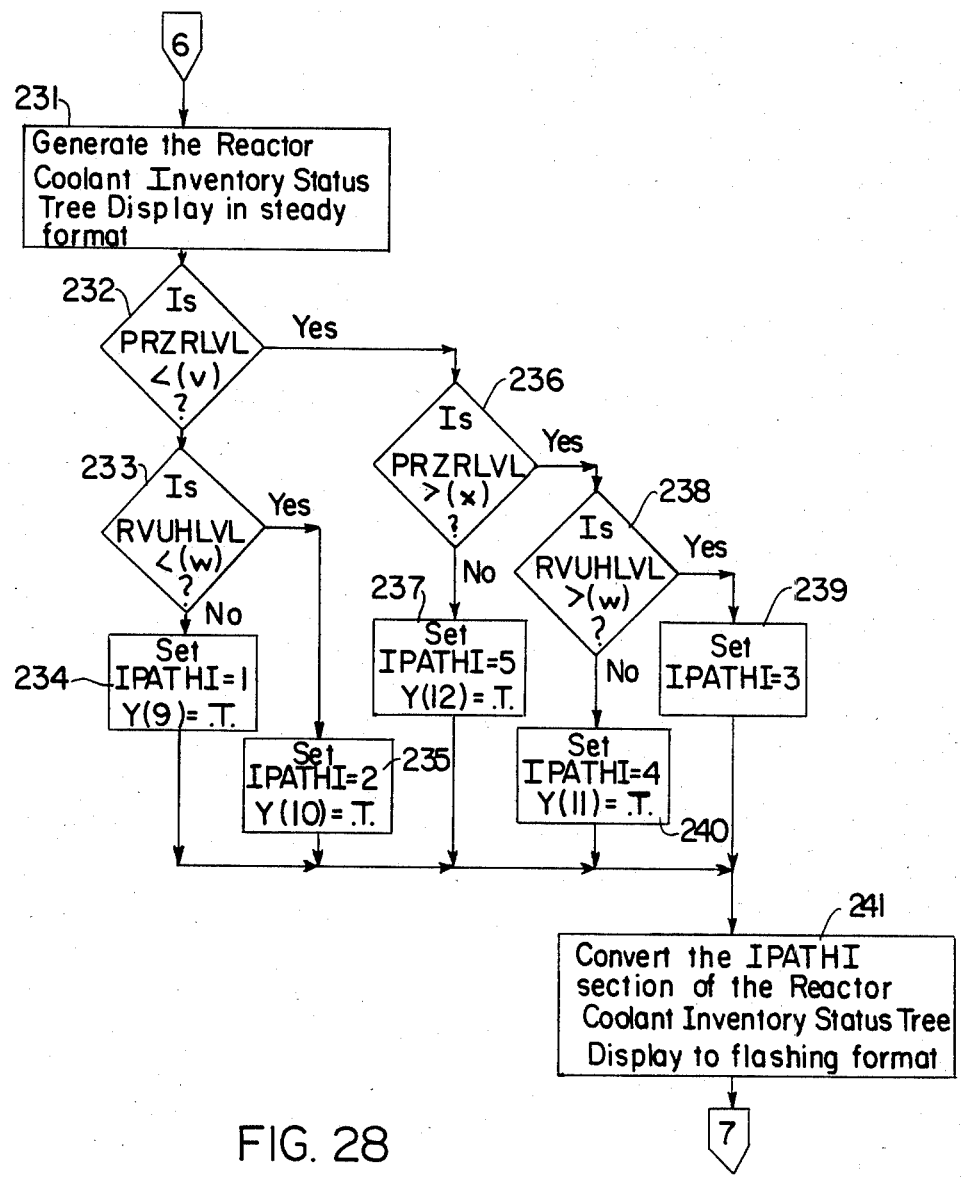

The Reactor Coolant Inventory status tree of FIG. 20 is generated by the routine disclosed in FIG. 28. After first generating the tree display in steady format in block 231, the pressurizer level, PRZRLVL is compared with a high setpoint value, v, in block 232. If the pressurizer level is higher than v, IPATHI is set equal to 1 or 2 and either Y(9) or Y(10) is made true in block 234 or 235 depending upon whether the reactor vessel upper head level, RVUHLVL, is less than or more than a setpoint value w, respectively, as determined in block 233. If the pressurizer level is lower than v and also below a lower setpoint value x, as determined in block 236, IPATHI is set equal to 5 and Y(12) is made true in block 237. On the other hand, if the pressurizer level is between v and x, IPATHI is set equal to 3 in block 239 or it is set equal to 4 and Y(11) is made true in block 240 depending upon whether the reactor vessel upper head level is above or below, respectively, the setpoint value w as determined in block 238. To complete the routine, the selected IPATHI is flashed in block 241.

Figure 29:
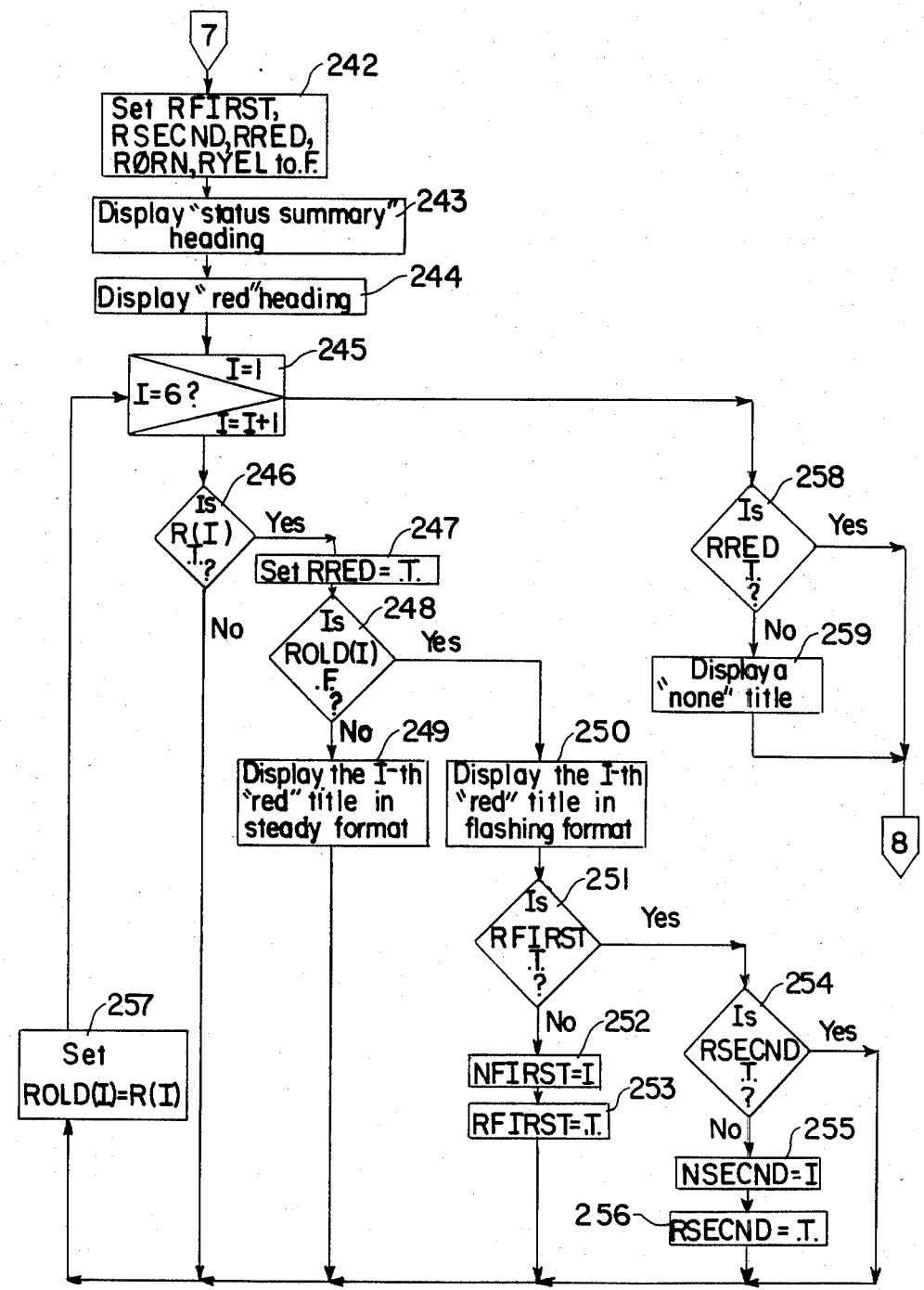
FIGS. 29 and 30 are flow charts suitable for generating the summary display of FIG. 21.
Figure 30:
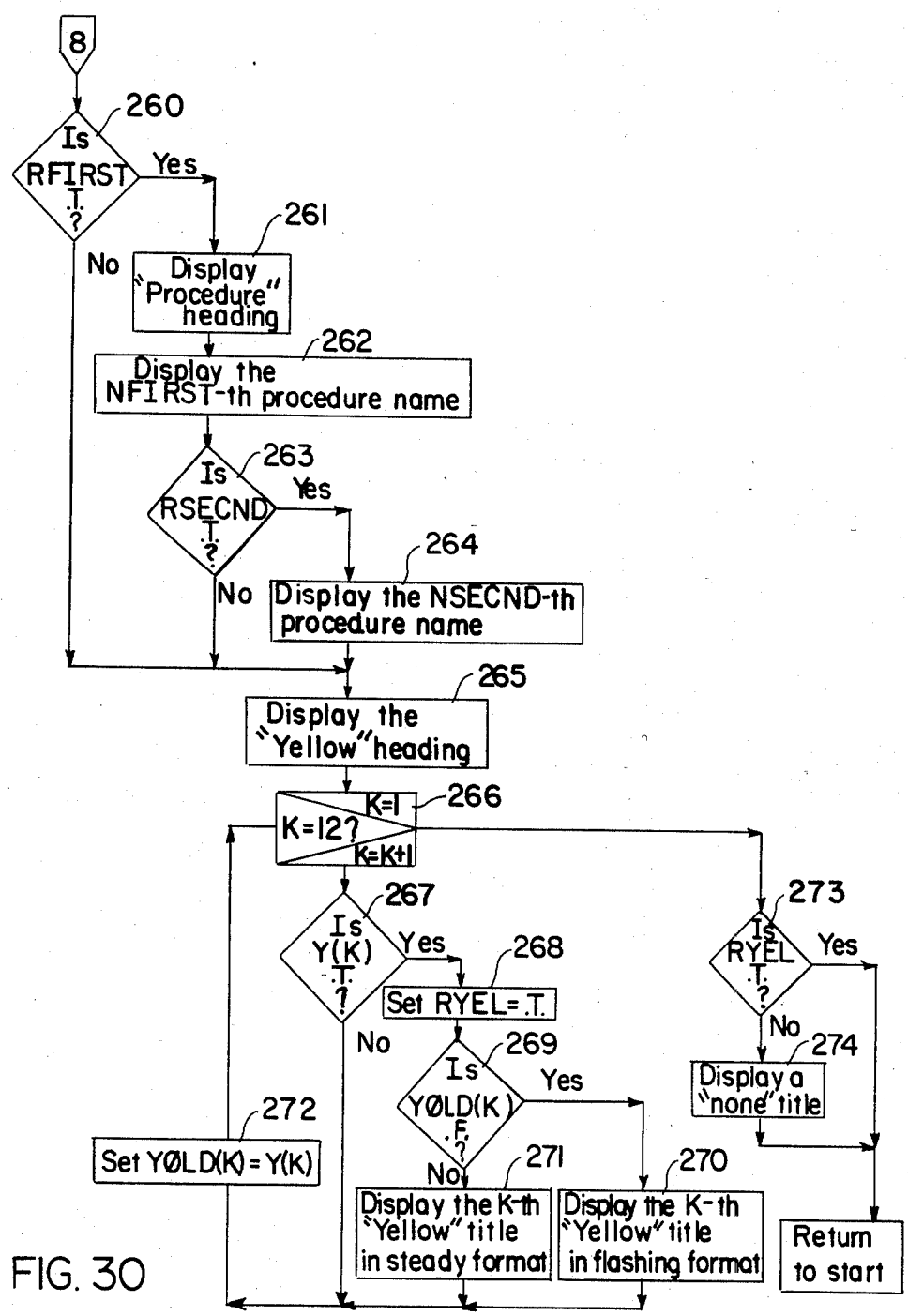

The flow charts related to the generation of the Critical Safety Function Status Summary Display illustrated in FIG. 21 are shown in FIGS. 29 and 30. The routine beings by setting a number of logicals to false in block 242 of FIG. 29. RFIRST and RSECND are used to indicate whether there are procedures called for which should be given first and second priority. As mentioned above, only newly selected procedures directed to the alleviation of hazardous (red) or a potentially hazardous (orange) status conditions are assigned "first" or "second" priority. The RRED, RORN and RYEL logicals are used to indicate whether or not any red, orange or yellow color coded terminal branch respectively, have been selected in any of the status trees.

With the logicals set, the STATUS SUMMARY and RED headings are displayed as indicated in blocks 243 and 244. A loop is then entered at block 245 wherein each indicator, R(I), associated with red coded terminal branches is tested in block 246 to see if it has been selected. If it has, the RRED logical is made true in block 247 and a determination is made in block 248 whether or not that particular red branch had been selected on the previous run of the status tree program by checking the status of a logical ROLD(I). If ROLD(I) is true, indicating that that red branch had also been selected on the previous run of the status tree programs, the verbal title assigned to the condition and the recommended procedure are displayed in steady format in block 249. On the other hand, first time conditions and procedures are displayed in flashing form in block 250.

The designation of first and second priority for execution of the procedures associated with newly selected "red" terminal branches is made by testing RFIRST in block 251. If RFIRST is not true, indicating no higher numbered "red" terminal branches have been selected on this run of the status tree programs, NFIRST is set equal to the number of the selected "red" terminal branch in block 252 and RFIRST is made true in block 253. If RFIRST was already true in block 251, but RSECND is not true in block 254, NSECND is set equal to the number of the selected "red" terminal branch in block 255 and RSECND is made true in block 256. Whatever the status of R(I), ROLD(I) is updated to the present logical state of R(I) in block 257 for use in the next run of the program. If none of the red terminal branches have been selected on this run of the program, whether for the first time or not, as determined in block 258, NONE is displayed under the "red heading" in block 259. The program for generating the potentially hazardous (orange) condition part of the summary display is basically the same as that for the "reds" shown in FIG. 29 except of course the logicals are not reset to false as in block 242 with the result that the "orange" terminal branches are only listed for first or second priority after any "reds".

Upon completion of the routine for generating a summary of the procedures associated with "orange" terminal branches, the routine of FIG. 30 is entered. If RFIRST is true in block 260, the title for priority procedures is generated in block 261, and the procedure and associated title indicated by NFIRST is displayed in block 262. If there is also a second priority as indicated by block 263, the procedure and title indicated by NSECND is displayed by block 264. Next, the "yellow" heading is displayed by block 265, and a loop is entered at block 266 in which RYEL is made true in block 268 if any "yellow" terminal path has been selected as indicated in block 267. If this branch had not been selected on the previous program run as determined in block 269, the title and procedure designation are displayed in flashing form by block 270. Otherwise, they are displayed in steady form by block 271. In any event, YOLD(K) for each "yellow" is set equal to the current status in block 272, for use during the next run of the program. If no "yellow" terminal branches were selected by the status trees during this run of the program, as determined in block 273, NONE is displayed under the "yellow" title by block 274 and the program is completed.

While the above described system for generating the Critical Safety Function status trees through computer generated CRT displays can be implemented by independent microprocessor driven units independent of other control and monitoring systems, these status trees can be implemented in simpler forms which are independent of computers. For instance, this aspect of the invention can be embodied in a vertical panel 275 seen in FIG. 31 on which the six critical safety function status trees are implemented sequentially by sets of colored and lighted bars 276. At the end of each path through each tree is a status indicator 277 which may take the form of a colored light or other suitable device to call attention to the current status of the particular critical safety function. More sophisticated solid state displays could be used instead if desired, or if required for seismic qualification of the display.

The patterns of colored light segments 276 used in FIG. 31 are the same as the line patterns illustrated for the corresponding status trees shown in FIGS. 15 through 20. Each branch segment 276 in each tree may be lighted to indicate that the selected path proceeds along that branch. The branches are selected manually by the operator. As shown in more detail in FIG. 32, a manual switch 278 is located at each branch point. Each switch has as many positions as the number of branches emanating from the branch point (usually two). Setting a switch to a particular position energizes the circuit that provides power to illuminate the selected branch and supplies power to the next switch. Also adjacent each branch point is a meter 279 which presents to the operator the measured or calculated value of the pertinent parameter. The ranges or setpoint values are indicated on the meter such as by the indicia 280 and a verbal description of the condition represented by each branch is indicated by indicia such as 281. Thus, the operator reads the meter, compares the indicated value with the setpoint value marked on the scale and sets the manual switch 278 accordingly to light up the selected branch. The operator then proceeds along the lighted branch to the next branch and sets the switch at the end of that branch to the position indicated by the associated meter. This process is completed until a path is completed all the way through the tree. The status indicator 277 is activated by selection of the terminal branch and may be a color coded light as indicated above to identify the level of hazard. If desired, the terminal branch may be colored similarily, in addition to, or in place of the status indicators. The associated functional response procedures can also be identified adjacent the terminal branch or status indicator in order to direct the operator to the appropriate response check list.

It should be noted that the process of switching at the branch points in the embodiment of the invention illustrated in FIG. 31 could be fully automated by using sets of bistables or equivalent components to effect the comparison of parameter values to the criteria corresponding to the respective branches and to establish the active path at each branch point. In such an embodiment, a sequencing device would be used to initiate successive sweeps through the sets of trees, and a delay/trigger device would be coupled with each switch to activate the next bistable along a developing active path after a suitable delay to allow stabilization at each branch point. Each bistable would remain in a HOLD status until activated by an earlier bistable/switch set and would return to HOLD status at the end of its switching interval. As a further alternative, the panel of FIG. 31 could be driven by a digital processor in a manner which would be understood by those skilled in the art from the discussions above. The manual system; however, provides the arrangement least subject to equipment failures or malfunctions. It does require; however, that the operator periodically reinitiate the process to stay abreast of changing conditions.

Slave display panels or CRTs repeating the active paths through the status trees could readily be provided in other Emergency Response Facilities (the Technical Support Center, for example) called for in regulations of the Nuclear Regulatory Commission to communicate to other plant personnel the Control Room perception of the plant status in terms of Critical Safety Functions.

Wile specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. A method of operating a complex, non-linear process control system comprising the steps of:
   periodically measuring designated system parameters;
   storing selected setpoint values associated with each designated parameter;
   sequentially comparing the measured value of selected of said designated parameters with the associated setpoint value to generate a representation of the measured range of said parameter, each parameter in the sequence being selected based upon the measured range of the preceeding parameter;
   generating a representation of the current status of the system in response to the measured ranges of the sequentially selected parameters; and
   operating the control system to effect changes in the measured value of at least one system parameter in response to selected representations of the status of the system to initiate a predetermined modification to the system status.

2. The method of claim 1 including storing multiple setpoint values for certain of said selected parameters, and comparing the measured values of each of said certain parameters with one of said setpoint values for that parameter selected from said multiple setpoint values on the basis of the measured range of the preceeding selected parameter.

3. The method of claim 1 or 2 including the step of generating from said representation of system status a display visually conveying to the operator said status.

4. The method of claim 3 including generating on said display representations indicating the prioritized actions to be taken by the operator in view of the displayed status to effect said change in at least one system parameter to initiate said modification to system status.

5. The method of claim 4 including generating on said display representations of the measured ranges of the parameters selected in sequence to generate the displayed representation of the system status.

6. The method of claim 3 wherein some of said sequences do not include comparison of the measured values of some of said parameters with the corresponding setpoint values and wherein the sequence of selecting the selected parameters is arranged so that those parameters that are selected in the most sequences are selected first whereby those sequences which require the selection of the fewest number of parameters are completed in the shortest time.

7. The method of claim 3 wherein some of said sequences do not include the comparison of some of the measured values with the corresponding setpoint values and wherein at least one of the selected setpoint values of identified ones of the parameters represent critical conditions in the system and wherein said identified ones of the parameters are selected first in said sequence of comparisons.

8. The method of 7 wherein the sequence of comparisons determined by measured values of said identified ones of the parameters which are in a range representative of hazardous conditions in the system are the only parameters selected in such sequence whereby a predetermined status representing a critical condition in the system is generated more rapidly and is more easily discerned from the visual display than a status representative of non-critical conditions in the system.

9. A method of monitoring the status of a complex non-linear control system comprising the steps of:
   storing signals representative of the current on-line value of designated system parameters and periodically updating said stored signals;
   generating setpoint signals for each designated system parameter;
   repetitively, sequentially comparing the stored signal for selected parameters with the corresponding setpoint signal to generate a signal representative of the current range of the selected parameter, with the sequence of comparisons being determined by the current range of the preceding parameter; and
   generating a representation of the status of the process control system based upon the current ranges of the sequentially selected parameters.

10. The method of claim 9 wherein said designated parameters include directly measured parameters and parameters calculated from one or more directly measured parameters.

11. The method of claim 9 wherein said step of generating a representation of the status of the process control system includes setting condition indicators to preset indications in response to a predetermined sequence of current range signals, and generating a display representing the settings of the condition indicators.

12. The method of claim 11 wherein the step of setting said condition indicators includes setting them to a first setting for indicated condition falling within a first predetermined category and setting them to a second setting for indicated conditions falling within a second predetermined category.

13. The method of claim 12 wherein the step of displaying representations of the settings of said indicators includes displaying representations of the indicators with said first setting in a first group and those with said second setting in a second group.

14. The method of claim 13 wherein the indicators associated with each group are each assigned a priority and wherein the representations of the indicator settings are displayed in said order of priority.

15. The method of claim 11 or 14 wherein the step of displaying the representations of said settings of said condition indicators includes displaying with them representations of predetermined steps to be taken in response to said setting.

16. The method of claim 15 wherein said step of displaying the representations of the settings of said indicators includes saving the setting of each indicator from the previous sequence of comparisons and indicating in said display the representations of said settings which are different from the saved setting for the corresponding condition indicator.

17. The method of claim 16 wherein said step of displaying the representations of the settings of said condition indicators includes displaying the representations of said settings which are different from the saved setting in order of said priorities.

18. The method of claim 12 wherein said step of setting said condition indicators to preset conditions in response to a predetermined sequence of current range signals is carried out as said predetermined sequences are completed during said sequence of comparing selected stored parameter signals with their corresponding setpoint signals.

19. The method of claim 9 wherein said step of generating a representation of the status of the process control system includes generating a display representative of the current range of each of the sequentially selected parameters.

20. The method of claim 19 wherein the step of generating a display representative of the current range of each of the sequentially selected variables includes generating a pattern of lines beginning with a single line segment which successively branches out into additional line segments with each branch point representing a comparison of a selected parameter with its setpoint and the line segments emanating from each branch point representing the selected ranges of values for the selected parameter, and indicating the path through the pattern of lines determined by the current ranges of the selected parameters.

21. The method of claim 20 wherein the path through the pattern of lines determined by the current ranges of the selected parameters is indicated by causing the terminal line segment in the selected path to stand out from the other terminal line segments.

22. The method of claim 20 wherein the line segment of said pattern of lines radiate visible light and the terminal line segment in the selected path is flashed to cause it to stand out from the other terminal line segments.

23. Apparatus for displaying the status of a nuclear fueled electric power generating unit comprising:
   means for on-line measurement of the values of selected system parameters;
   means for indicating selected set point values for each selected parameter to define preselected ranges for the selected parameters;
   means for comparing the measured value of said selected parameters with the selected set point values to determine the preselected range of values into which the measured value of each selected parameter falls;
   means for generating a visible pattern of lines which begins with a single line segment and successively branches out into additional line segments with the line segments emanating from each branching point each representing one of the preselected ranges of values for a successive one of said selected parameters; and
   means for generating a visible indication associated with said pattern of lines representing a continuous path of line segments through said pattern with each line segment in the path representing the preselected range of values in which the measured value of one of the selected parameters falls.

24. The apparatus of claim 23 including means associated with the end of each path of line segments for generating a visible indication of the predetermined criticality of the status of the unit represented by the path as determined by the preselected range of values into which the measured value of each of the selected parameters in the path falls.

25. The apparatus of claim 24 wherein said means associated with the end of each path for indicating the criticality of the path includes means for generating the last line segment in each path in a color preselected to indicate the relative criticality of the status represented by the path.

26. The apparatus of the claim 23 or 25 wherein said means for generating a visible indication of the path through said pattern of lines includes means for flashing the last line segment in the selected path.

27. The apparatus of claim 24 including means adjacent selected ones of said criticality indicating means providing direction as to appropriate action to be taken.

28. The apparatus of claim 23 wherein said pattern of lines extends generally longitudinally from said single initial line toward the last of the line segments in any path with the line segments emanating from each branch point extending laterally outward from the branch point and then generally parallel to said longitudinal direction to the next branching point, with branching points associated with each particular selected parameter generally all being laterally aligned.

29. The apparatus of claim 23 including means adjacent each branch point for generating a visible indication of the measured value of the parameter associated with said branch point.

30. The apparatus of claim 29 including means associated with said means adjacent each branch point for generating a visible indication of the measured value of the associated parameter, for generating a visible display of the selected ranges of values for that parameter whereby the measured range of the parameter can be determined by visually observing the measured value and the selected range of values for the parameter.

31. The apparatus of claim 23 or 30 wherein said means for generating said visible pattern of lines includes energizable means for generating visible line segments when energized and wherein said means for generating a visible indication associated with said pattern of lines representing a continuous path of line segments through said pattern includes means for intermittently energizing said energizable means in a manner to cause at least the last line segment making up said continuous path to flash off and on.

32. The apparatus of claim 23 or 30 wherein said means for generating said visible pattern of lines includes line segments which are energizable to emit visible light and wherein said means for generating a visible indication of a path through said pattern of line segments includes means for energizing the line segments each representing the selected range in which the measured value of one of the selected parameters falls.

33. The apparatus of claim 32 wherein said means for energizing said line segments includes switch means located adjacent each branch point and positionable to energize the line segment emanating from said branch point which represents the selected range in which the measured value of the parameter associated with the branch point falls.

34. The apparatus of claim 23 including means for generating a plurality of visible patterns of lines with the parameters selected for each pattern being selected such that each pattern generates a visible representation of the status of a different critical function in the system.

35. The apparatus of claim 34 including means for generating at the end of each path of line segments through each pattern of lines a visible indication of the relative criticality of the status of the associated critical function when the measured values of the selected parameters all fall within the preselected ranges represented by said path.

36. The apparatus of claim 35 wherein said means for generating a plurality of visible patterns of lines includes means for presenting all of said patterns simultaneously with said patterns arranged in a prearranged order of the critical nature of the functions represented.

37. The apparatus of claim 34 or 36 in combination with the nuclear fueled electric power generating unit and wherein said unit includes a reactor and whereins said selected critical functions include: reactor subcriticality; reactor core cooling; reactor coolant system integrity; heat sink capability of system; containment integrity; and reactor coolant inventory.

38. An apparatus for monitoring the status of a complex, non-linear process control system comprising:
  means for generating signals representative of the on-line value of designated system parameters;
  means for generating selected setpoint signals for each designated system parameter;
  means for storing said on-line value signals and said setpoint signals;
  means for periodically updating the stored on-line value signals with the current on-line value signals;
  means for sequentially comparing selected stored on-line value signals with the corresponding setpoint value signal to generate a signal representative of the range of said stored on-line value signal, said parameters in said sequence being selected on a predetermined basis of the value of the range signal of the preceeding parameter in the sequence; and
  means responsive to the sequence of range signals for generating a representation of system status.

39. The apparatus of claim 38 in combination with the complex, non-linear process control system and including means responsive to said representation of system status for modifying the operation of the process control system to effect a predetermined change in the on-line value of at least one of said designated system parameters.

40. The apparatus of claim 38 or 39 including means for generating a visible pattern of lines beginning with a single line segment which branches into additional line segments with each branch point representing a comparison of a stored on-line value signal with its corresponding stored setpoint signal and each line segment emanating from a branch point representing an on-line range signal for the associated parameter, and means responsive to the representation of system status for generating a visible indication associated with said visible pattern of lines of the line segments representative of the sequence of measured range signals which led to the generation of the status representation.

41. The apparatus of claim 40 wherein said means for generating a visible indication of the line segments repesentative of the sequence of range signals which led to the generation of the status representation comprise means for flashing at least the last in the sequence of such line segments.

42. The apparatus of claim 40 wherein said means for generating said pattern of lines includes means for generating a visible indication of the stored on-line value signal adjacent each branch point in the sequence of comprisons.

43. The apparatus of claim 40 wherein said means for generating said pattern of lines includes means for generating a visible indication of the criticality of the status represented by each sequence of line segments through said pattern of lines.

44. The apparatus of claim 43 wherein the means for indicating the criticality of the status represented by each sequence of line segments comprises means for displaying the last line segment in each sequence in a preselected color representative of the relative criticality of the status represented thereby.

45. The apparatus of claim 40 including means for generating a visible indication adjacent the visible pattern of lines of predetermined steps to be taken in operation of the control system to modify the status of the system.

* * * * *